Figure 1:
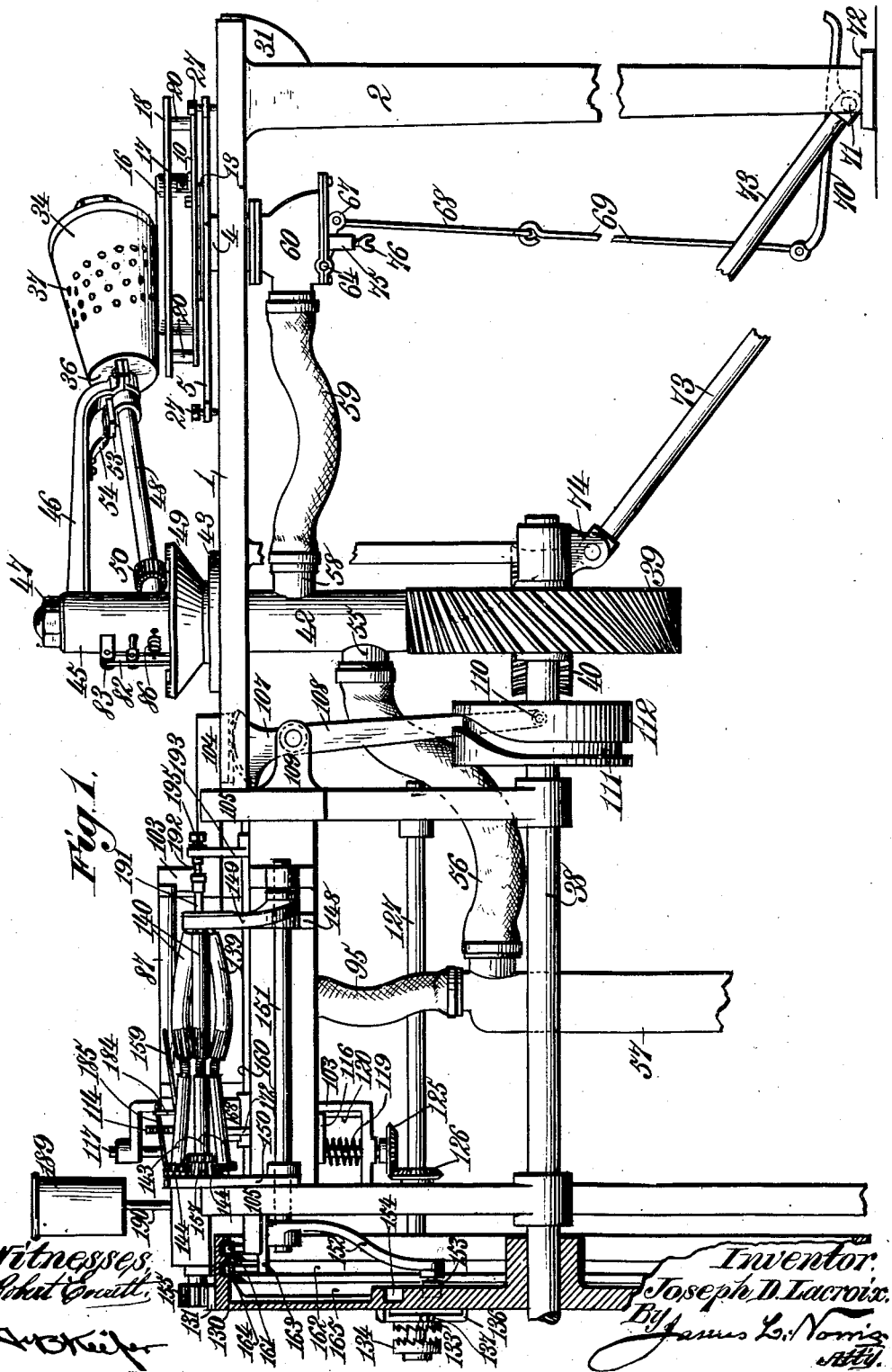

J. D. LACROIX.
CIGAR MACHINE.
APPLICATION FILED FEB. 12, 1902. RENEWED NOV. 21, 1902.

1,070,818.

Patented Aug. 19, 1913.
7 SHEETS—SHEET 1.

BEST AVAILABLE COPY

Witnesses
Inventor
Joseph D. Lacroix.

J. D. LACROIX.
CIGAR MACHINE.
APPLICATION FILED FEB. 12, 1902. RENEWED NOV. 21, 1902.
1,070,818.
Patented Aug. 19, 1913.
7 SHEETS—SHEET 2.
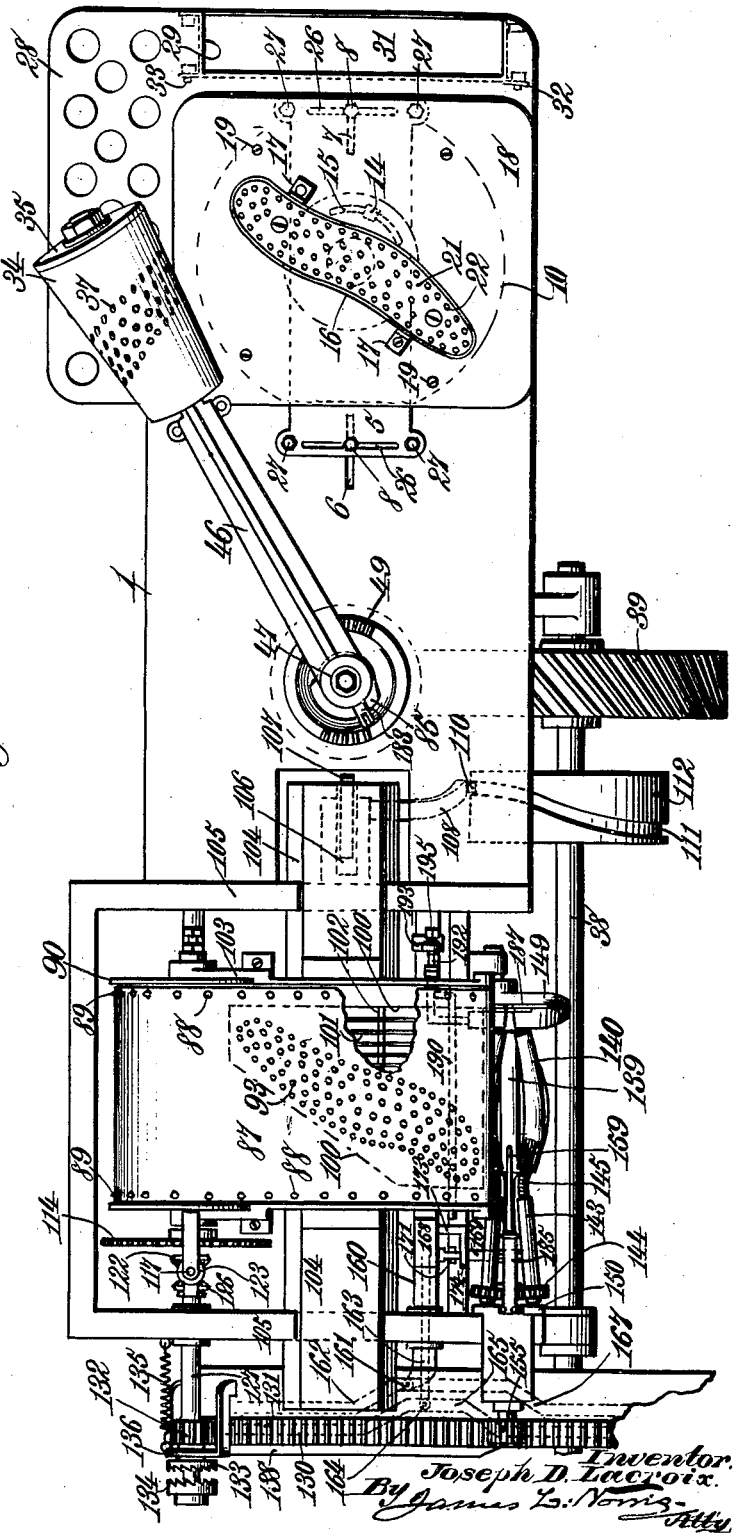
Witnesses.
Robt Evatt
[signature]
Inventor.
Joseph D. Lacroix.
By James L. Norris
Atty.

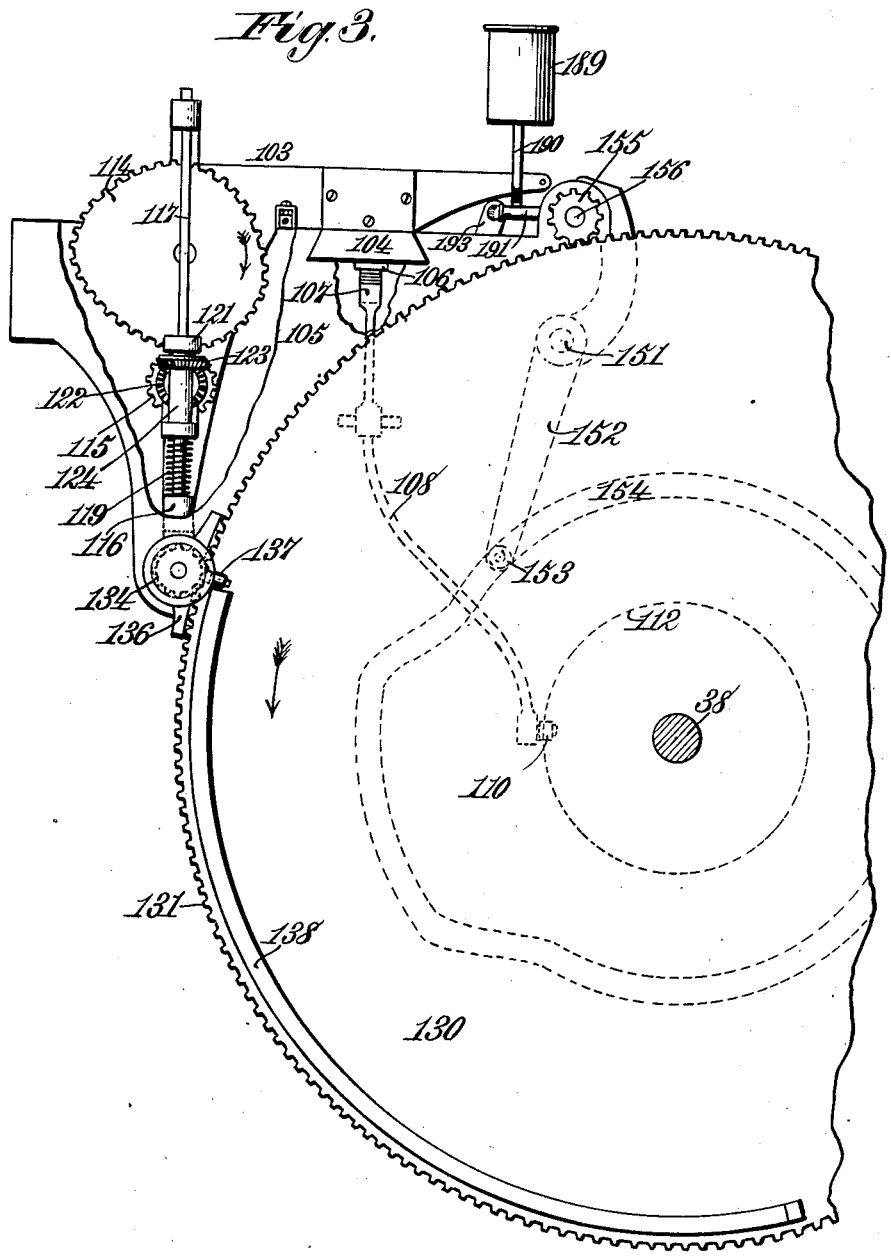

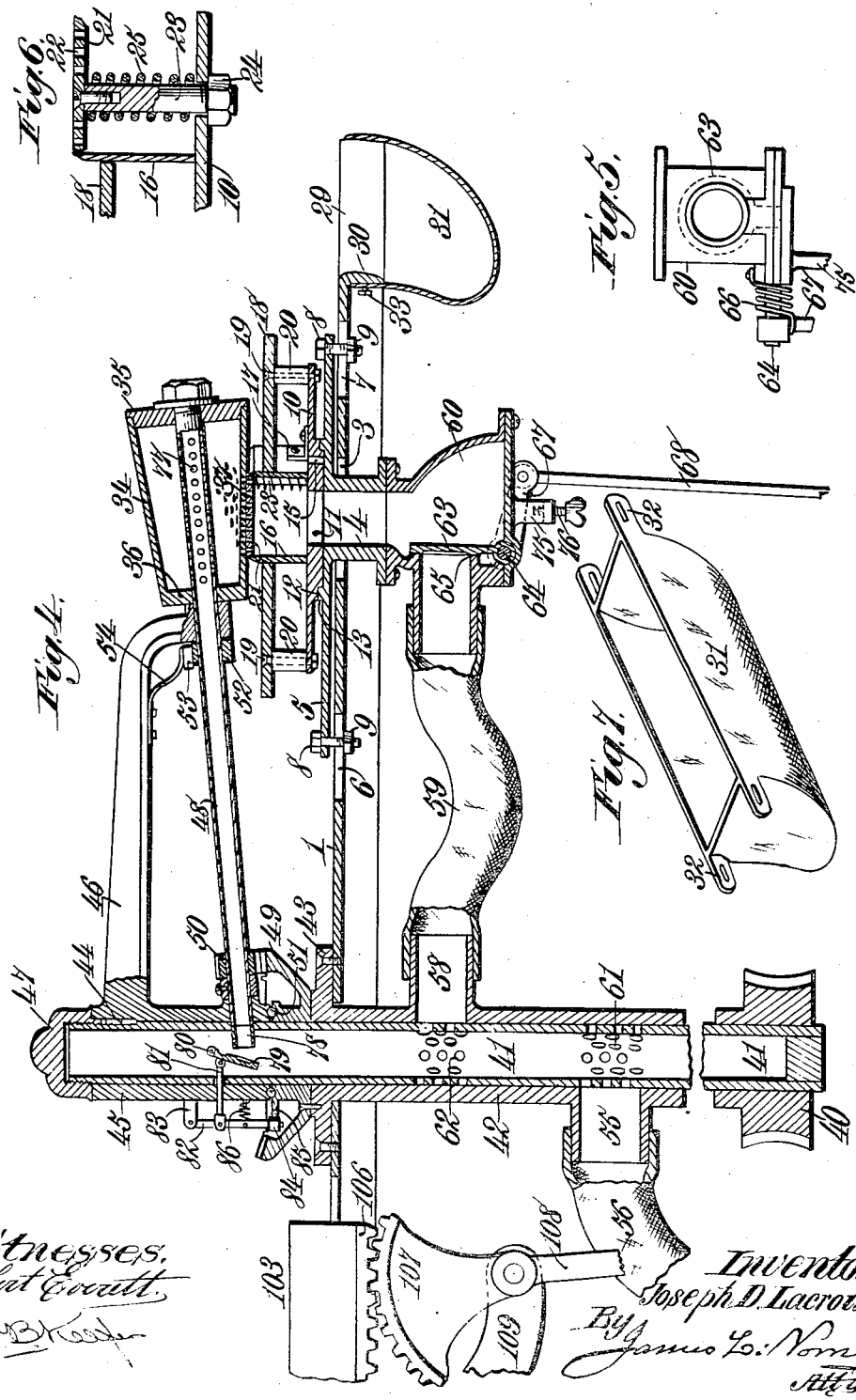

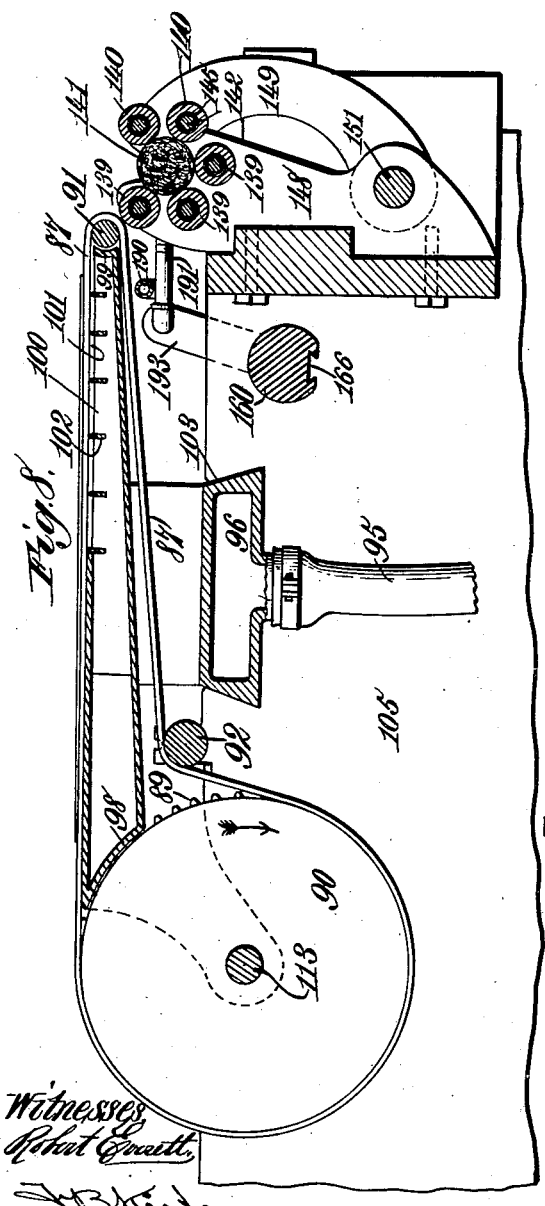

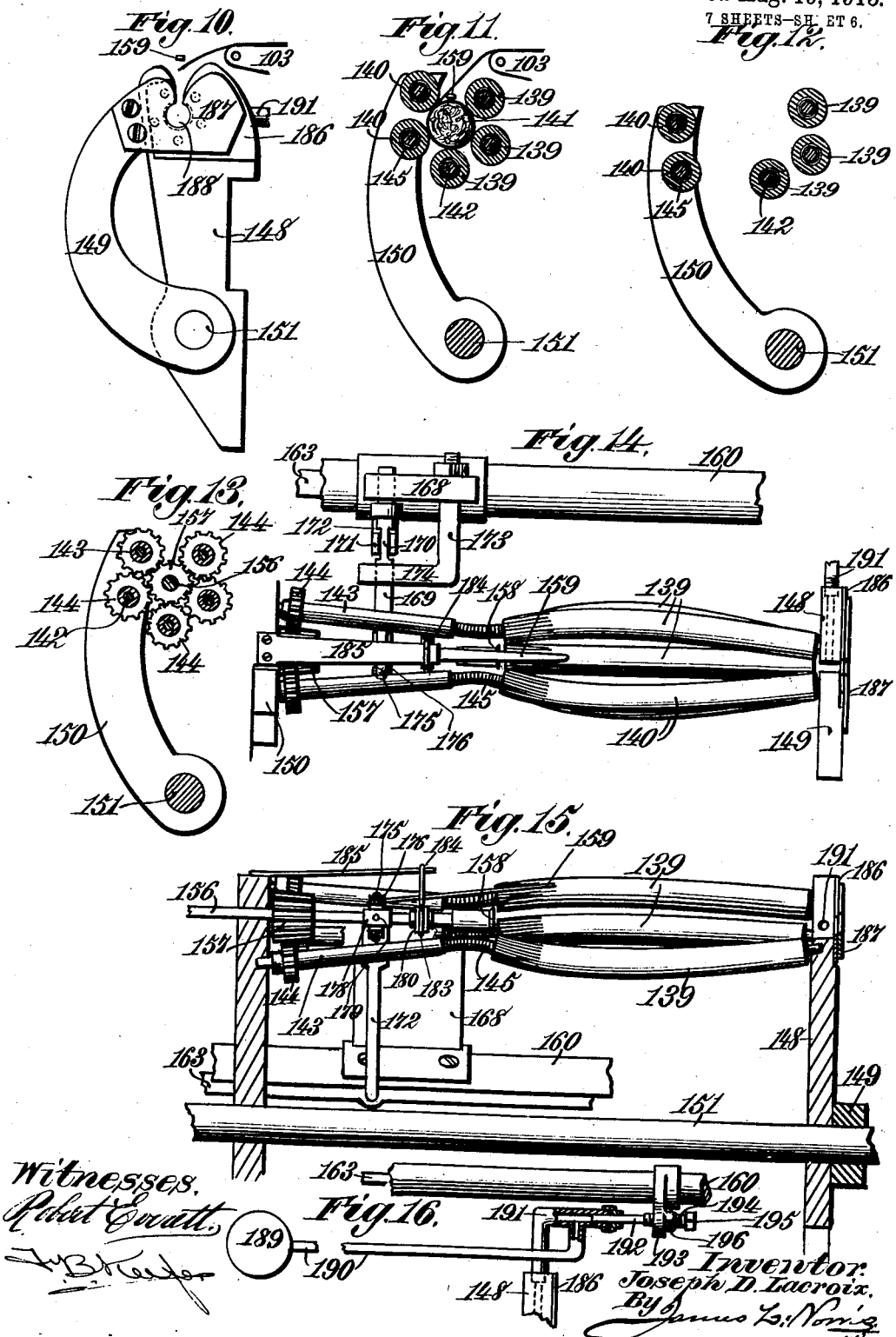

J. D. LACROIX.
CIGAR MACHINE.
APPLICATION FILED FEB. 12, 1902. RENEWED NOV. 21, 1902.
1,070,818.
Patented Aug. 19, 1913.
7 SHEETS—SHEET 7.
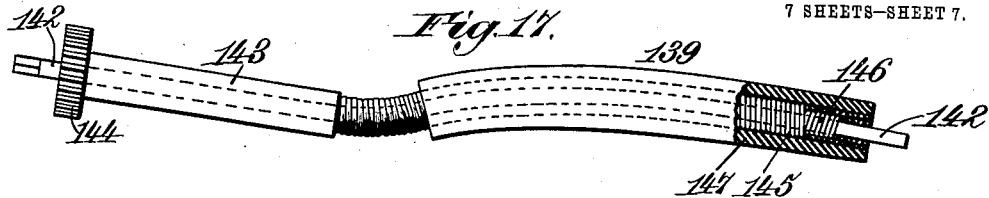
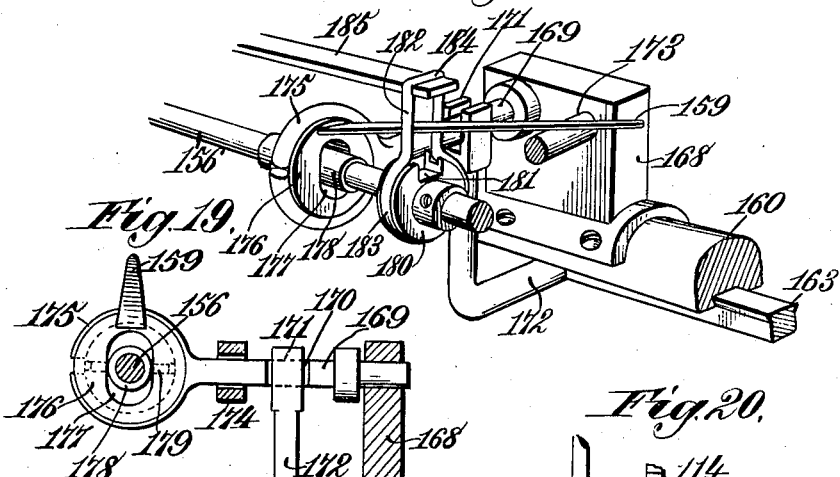
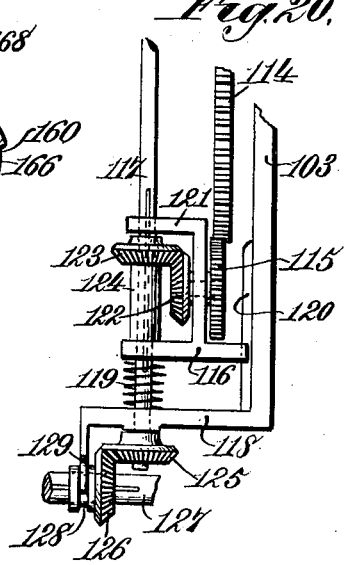
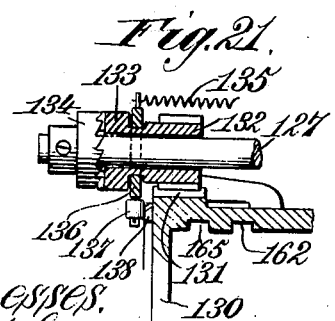
Witnesses.
Robert Everett.
J. B. Reeder.
Inventor:
Joseph D. Lacroix.
By James L. Norris.
Atty.

UNITED STATES PATENT OFFICE.

JOSEPH D. LACROIX, OF NEW ORLEANS, LOUISIANA, ASSIGNOR TO EUGENE H. DAVIS, OF NEW YORK, N. Y.

CIGAR-MACHINE.

1,070,818.  Specification of Letters Patent.  Patented Aug. 19, 1913.

Application filed February 12, 1902, Serial No. 93,765. Renewed November 21, 1902. Serial No. 132,296.

*To all whom it may concern:*

Be it known that I, JOSEPH D. LACROIX, a citizen of the United States, residing at New Orleans, in the parish of Orleans and State of Louisiana, have invented new and useful Improvements in Cigar-Machines, of which the following is a specification.

My invention relates to apparatus for the manufacture of cigars, cheroots and the like, the object of the same being to provide in an organized machine, the parts of which are operated from a single source of power, means for cutting the wrapper into proper shape, means for removing the wrapper from a support or die and carrying and delivering the same to wrapping mechanism or wrapper applying mechanism, means for varying the angle at which the wrapper is delivered to the wrapping mechanism or wrapper applying mechanism so as to cause the same to be applied evenly and smoothly to a bunch of irregular thickness, means for moving the end of the wrapper into contact with the tuck end of the bunch and retaining the same in place until more than one revolution of the bunch has been effected, means for imparting a continuous rotation to the flexible, irregularly-shaped wrapper-applying rolls, means for applying paste to one of the headers, means for cutting the wrapper at the head of the cigar, means for applying power from a main drive-shaft to the various operative parts of the machine, means for applying suction to the cutting die, to the hollow roller coöperating therewith and to the traveling wrapper carrier, means for varying the suction on said die, and means for automatically varying the suction in said roller.

Other objects of the invention will hereinafter appear.

A preferred embodiment of the invention will be explained in the following description to illustrate one practical form of the machine for effectively carrying out the several operations sought and arriving at the result desired, but it will be understood that the invention is not limited to the precise organization of elements that will be disclosed as it is intended to adopt any equivalent mechanisms or mechanisms having an analogous operation or function.

In the drawings forming part of this specification Figure 1 is a side elevation, partly in section, of a cigar machine constructed in accordance with my invention; Fig. 2 is a plan view of the same; Fig. 3 is an end elevation; Fig. 4 is a longitudinal section of one end of the machine; Fig. 5 is a detail view of the valve in the suction-pipe leading to the cutting-die; Fig. 6 is a detail sectional view of the cutting-die and its bed; Fig. 7 is a detail perspective view of the bag for catching the scraps from the cutting mechanism; Fig. 8 is a transverse sectional view taken through the wrapper-support and the suction-box beneath the same; Fig. 9 is a longitudinal sectional view through the same parts; Figs. 10 and 11 are detail views showing the wrapper being delivered to the wrapper-applying rolls, and the position of the tucking-needle at two different times; Fig. 12 is a detail sectional view, showing the wrapper-applying rolls separated; Fig. 13 is an end view of the wrapper-applying rolls shown in operative relation to the driving gear therefor; Fig. 14 is a plan view, and Fig. 15 is an elevation, partly in section, of the wrapper applying rolls on an enlarged scale; Fig. 16 is a detail view showing the paste-cup and the means for forcing the paste therefrom to the heading-die; Fig. 17 is a detail view in sectional elevation of one of the wrapper-applying rolls on an enlarged scale; Fig. 18 is a detail perspective view of the mechanism for raising and lowering and revolving the tucking-needle; Fig. 19 is a cross-section of the same; Figs. 20 and 21 are detail views of the clutch and gearing for operating from the main driving-gear the irregular gear for actuating the wrapper-support.

Like reference numerals indicate like parts in the different views.

The bed 1 of the main frame of the machine is mounted upon legs or standards 2, and is provided near one end thereof with an opening 3 through which projects a boss 4 extending downwardly from a plate 5 located on the upper side of said bed 1. The opening 3 is of greater dimensions than the boss 4 which projects therethrough, so that said boss is capable of movement longitudinally in said opening. The bed 1 is also provided on opposite sides of the opening 3 with elongated slots 6, 7, through which extend the bolts 8 in the plate 5. The lower ends of said bolts are provided with nuts 9 by means of which the plate 5 may be locked to the bed 1. By loosening the nuts 9, however, the plate 5 may be moved longitudinally of the bed 1, the bolts 8 moving in the elongated slots 6 and 7, and the boss 4 moving in the opening 3. Said plate 5 is, therefore, capable of longitudinal adjustment on the bed 1. Located above the plate 5 is a substantially circular plate or disk 10, the same being capable of turning movement on the plate 5. The said disk 10 is provided with a central opening 11 which registers with the opening through the boss 4, and said disk is also provided with a thickened portion on its under side around said opening 11, which has formed in it an annular groove, channel or recess 12. This groove 12 receives an annular rib or projection 13 on the upper face of the plate 5. Said groove 12 and the rib 13 which fits therein serve as a guide for the disk 10 in its turning movement on the plate 5. Of course it is obviously within the scope of my invention to reverse the positions of the groove 12 and rib 13 to accomplish the same results. Extending upwardly through the plate 5 is an adjusting bolt 14 which projects through a segmental slot 15 formed in the disk 10 concentric with the opening 11 in said disk. The upper end of the bolt 14 is provided with a nut by means of which said disk 10 may be locked to the plate 5. By loosening said nut, however, the disk 10 is capable of turning movement on the plate 5. It will thus be seen that the disk 10 is capable of axial adjustment on the plate 5. The die 16, which has the cutting edge at its upper end shaped to conform to the shape of the wrapper to be cut, is secured to the disk 10 by means of the brackets 17. The said die extends up through and to a point above the table 18, which table is located above and parallel to the disk 10, and is secured to said disk by means of the screws 19. Said screws pass through the tubular spacing blocks 20, which serve to separate and hold in proper relative positions the disk 10 and table 18. The die 16 is hollow, as shown, and communicates with the opening 11 at the center of the disk 10. Within the die 16 and lying in close relation to the inner surface thereof is an upwardly-spring-pressed die bed 21, the same being provided with perforations 22, and normally lying in substantially the same plane with the cutting edge of said die. The said bed 21 is secured to the bolts 23, which extend down through the disk or plate 10, and are provided on their lower ends with nuts 24 adapted to engage the under side of said disk 10, for the purpose of limiting the upward movement of the bed 21. The bolts 23 are surrounded by coil springs 25, which serve to maintain the bed 21 normally at the limit of its upward movement, but provide for the yielding of said bed at the proper time. It has heretofore been stated that the plate 5 is capable of longitudinal adjustment on the bed 1 of the machine, and that the disk 10 is capable of axial adjustment on the plate 5. Said plate 5 is also capable of lateral adjustment on the bed 1, the latter adjustment being effected by the provision of transverse slots 26 in the plate 5, in which the bolts 8 are located. It will be obvious that when the nuts 9 on the lower ends of the bolts 8 are loosened, the plate 5 and the parts carried thereby may be moved transversely of the machine, along the slots 26. The plate 5 is also provided at the corners thereof, or at three or more different points, with adjusting screws 27, provided for the purpose of regulating the position of the plane of the upper face thereof. These adjusting screws extend through the plate 5 and are adapted to bear against the upper surface of the bed 1. If it be desired to raise the outer end of the plate 5 or depress the inner end thereof, this result may be effected by loosening the nuts 9 on the lower ends of the bolts 8, screwing in the two set-screws 27 at the outer end of the plate 5 and screwing out the two set-screws 27 at the inner end of the plate 5. By now tightening the nuts 9 on the ends of the bolts 8 the plate 5 will be held in its adjusted position. It is of course obvious that by reversing the operation just described the plate 5 may be tilted in the opposite direction, and it is also obvious that by means of the set screws or adjusting screws 27 the plate 5 may be tilted transversely of the bed 1 in one direction or the other. Now, as the plate 5 is capable of longitudinal and lateral adjustment on the bed 1, and is capable of tilting adjustment on the bed 1, and as the disk 10 is capable of axial adjustment on the plate 5, it will be apparent that as the die 16 is secured to the disk 10 said die may be adjusted bodily, both longitudinally and transversely of the bed of the machine, may be axially adjusted, and may be adjusted so as to vary the position or inclination of the plane of the upper cutting edge thereof. These various adjustments of the die 16 are provided for a purpose which will hereinafter appear.

The bed 1 of the machine is provided on one side of the die 16 and table 18 with a shelf or extension 28 for receiving and supporting the tobacco leaves which are to be subsequently cut up into wrappers. It also has one end thereof adjacent to the die 16 and table 18 cut away, as shown at 29, and provided with a flange 30 for the attachment of a bag 31 to catch the scraps or offalls from the die 16 and table 18. The said bag 31 is provided with slotted tabs or lips 32 by means of which said bag may be removably connected with buttons or projections 33 on the bed 1.

Coöperating with the die 16 is a continuously revolving, axially rotatable, hollow, preferably cone-shaped member or roller 34, the same having closed heads 35, 36, and provided with a series of perforations 37 conforming in arrangement and outer contour with the cutting edge of the die 16. The revolving and rotary movements of the member or roller 34 are derived from the main drive-shaft 38 mounted in suitable bearings in the main frame of the machine and continuously rotated from any suitable source of power. The said drive-shaft 38 has secured to it a worm-gear 39 which meshes with a worm 40 on a hollow, vertically-disposed shaft or tube 41, the said shaft being located within, and moving in close contact with the inner surface of, a fixed sleeve 42 extending through an opening in the bed 1, and provided with a flange 43 by means of which it is screwed, bolted or otherwise secured to said bed. The hollow shaft 41 extends up above the bed 1 of the machine, and has secured to it, by means of a key 44 or other suitable device, the tubular portion or hub 45 of a bracket-arm 46. The upper end of the hollow shaft 41 above the hub 45 is closed by a cap 47. The outer or free end of the bracket-arm 46 is provided with bearings for the hollow stem 48 of the member or roller 34, and constitutes a support for said member or roller. Secured to the flange 43 of the fixed sleeve 42 is a mutilated gear 49 with which meshes a pinion 50 on the stem 48 of the member or roller 34. The hub of the mutilated gear 49 constitutes a support for the hub 45 of the bracket 46 and between these two parts ball-bearings 51 are provided. The hollow stem 48 of the member or roller 34 has bearings in, and is supported by, the lower end of the hub 45 just within the pinion 50.

From the foregoing description it will be seen that as the drive-shaft 38 is rotated, it will, through the worm-gear 39 and worm 40, impart a turning movement to the tubular shaft 41 to which the worm 40 is secured. As the shaft 41 turns, it carries with it the bracket-arm 46 and the member or roller 34, whose stem is mounted therein, causing said member or roller to revolve about the hollow shaft 41. At the same time the pinion 50 moves in mesh with the teeth of the mutilated gear 49, and an intermittent rotary movement of said member or roller 34 is effected. During the revolution of the member or roller 34 the same moves over and in contact with the upper cutting edge of the die 16, and serves to cut the tobacco leaf placed upon said die into the proper shape for a wrapper.

By means which will be hereinafter described, the wrapper as it is cut on the die 16 is lifted therefrom by the member or roller 34. The perforations 37 in the member or roller 34 preferably extend completely around said member or roller, so that the opposite ends of the series of openings 37 will lie in a plane coincident with the longitudinal center or axis of said member or roller. The gear 49 is mutilated in order to provide for the rotation of the member or roller 34 while it is passing over the die 16, and to stop said rotation when said member or roller passes beyond said die. In order to prevent any rotary movement of the member or roller 34 after the same has passed from the end of the die 16 and after the pinion 50 passes from the teeth of the gear 49 to the mutilated portion thereof, I provide upon the stem 48 of the member or roller 34 a collar 52 having a flat face at one point in its periphery, the said collar moving in contact with a presser-block 53 on the end of a spring 54 carried by the bracket-arm 46. The flat face of the collar 52 is so disposed that when the member or roller 34 passes from the end of the die 16, the same will be opposite the presser-block 53. The rotation of said member or roller, due to momentum, is, therefore, instantly arrested as soon as the necessity for its rotation ceases. The object of this construction will hereinafter appear.

The fixed sleeve 42 heretofore referred to is provided with a lateral extension or nipple 55 at one point, to which is connected a suction pipe 56, in turn connected with the main suction-pipe 57. The said sleeve 42 is also provided with a lateral extension or nipple 58 which is connected, through a flexible pipe or coupling-piece 59, with a valve casing 60 secured to the under side of the boss 4 on the plate 5 and communicating with the opening in said boss. Opposite the nipple 55 on the sleeve 42, the hollow shaft 41 is provided with a series of perforations 61, and opposite the nipple 58 on the sleeve 42 said shaft 41 is provided with a series of perforations 62. Through the perforations 61 the suction from the main suction-pipe 57 may act upon the interior of the hollow shaft 41, and through the perforations 62 in the shaft 41 the suction from the same source may act upon the valve casing 60, and through the latter upon the interior of the die 16. In the valve casing 60 is mounted a flap-valve 63, the same being mounted upon a rock-shaft 64 projecting beyond the casing 60 and adapted to engage a seat 65 when in its closed position. The said valve is normally retained in its closed position, and after operation is returned to its closed position, by means of a coil-spring 66 secured at one end to a stationary part of the casing 60 and engaging at its opposite end a crank 67 on the shaft 64. The said crank 67 is connected through the pivoted links 68, 69 with the foot-treadle 70, as clearly shown in Fig. 1 of the drawings. This treadle 70 is attached to the center of a shaft 71, extending transversely of the machine and supported when in its operative position upon the base flanges 72 of the legs or standards 2. The opposite ends of the shaft 71 are connected through the arms 73 to brackets 74 on the frame of the machine. By constructing and mounting the treadle 70 in the manner just described, it will be seen that the same may be lifted up from its normal position out of the way for the purpose of cleaning beneath the machine. When shifted to its upper position, the links 68 and 69 bend at the point of their pivotal connection with each other and the arms 73 turn on their pivotal connections with the brackets 74.

When the treadle is in its operative position, as shown in Fig. 1 of the drawings, it will be noted that by depressing the inner end thereof the crank 67 will be rocked and the valve 63 opened. The extent of opening movement of this valve is thus under the control of the operator, so that the suction acting upon the under side of the die bed 21 within the die may be increased or decreased, and accurately regulated. In order to limit the opening movement of the valve 63, however, I secure to the under side of the valve casing 60 a bracket 75 having a set-screw 76 in the horizontal portion thereof, which set-screw lies within the path of movement of the crank 67 and is engaged by said crank when the latter is moved downwardly. By turning the set-screw 76 so as to raise or lower the same, it will be obvious that the extent of the opening movement of the valve 63 may be decreased or increased. The suction acting within the hollow shaft 41 from the main suction-pipe 57, through the connecting pipe 56, nipple 55 and perforations 61, also acts upon the inside of the member or roller 34 through the hollow stem 48. To effect this result, that portion of the stem 48 which is located within the member or roller 34 is provided with perforations 77. It has heretofore been stated that the stem 48 of the member or roller 34 is mounted to turn in bearings in the outer or free end of the bracket-arm 46 and in the lower end of the hub 45. Said stem communicates with the interior of the hollow shaft 41 by way of a non-rotatable tube 78 whose inner end constitutes the seat for a valve 79. The said tube 78 is secured to the hollow shaft 41 in line with the stem 48 and closely abuts against the adjacent end of said stem. The valve 79 which is adapted to seat against the tube 78 is provided for regulating the suction on the inside of the member or roller 34. This is done by increasing and decreasing the distance between said valve and the inner end of the tube 78, which operation of the valve is effected automatically by the means now to be described. The said valve 79 is fulcrumed at 80 to the inner wall of the hollow shaft 41, and is connected through a link 81 with a lever 82 fulcrumed upon a bracket 83 on the outside of the hub 45 of the bracket 46.

The lower end of the lever 82 carries a roller 84 which moves in contact with a cam 85 formed upon or secured to the hub of the fixed gear 49. The said roller 84 is retained in contact with said cam by means of the spring 86, which is connected to the lever 82 at a point intermediate its ends and to the hub 45. Now, it will be observed that during the rotation of the hub 45 and the hollow shaft 41, the free end of the lever 82 will be moved outwardly and inwardly in accordance with the irregularities in the curvature of the cam 85 against which the roller 84 on said lever bears. When the lever 82 is moved outwardly away from the shaft 41, it will obviously move the valve 79 in the same direction, and separate the same from the tube 78. The full force of the suction in the hollow shaft 41 may then act through the stem 48 and perforations 77 upon the inside of the member or roller 34. When the lever 82 is moved in the opposite direction, the valve 79 will be moved in the same direction toward the tube 78. The mouth or entrance to said tube will, therefore, be contracted to an extent corresponding to the degree of approach of the valve 79 to said tube, and the suction from the hollow shaft 41 through the stem 48 and perforations 77 on the inside of the member or roller 34 will be correspondingly decreased. The object of this automatic control of or variation in the suction on the inside of the member or roller 34 will appear as the description proceeds.

The mechanism heretofore described relates solely to the means for cutting the wrapper and removing it from the cutting die. In connection with these parts there is for the purposes of illustration shown a traveling support upon which the cut wrapper is delivered and from which said wrapper is delivered at the proper angle and at the proper speed to the wrapper-applying rolls. Said support is designated by the numeral 87, and consists of an endless band or apron constructed of rubber, flexible sheet metal or other suitable material. The same is preferably provided along its opposite edges with perforations 88 for the reception of teeth or projections 89 on the driving-roller 90 around which said apron passes. The object of the perforations 88 and the coöperating teeth 89 is to provide for the positive feed of said apron or support at the same speed as that of the roller 90. The support or apron 87 passes around the roller 90 at one end, around the roller or rollers 91 at the opposite end, and around the guide roller or rollers 92 located between the rollers 90 and 91. At one or more points in the surface of the support or apron 87, the same is provided with a series of perforations 93 conforming in outer contour with the cutting edge of the die 16 and with the outer contour of the perforations 37 in the member or roller 34. While but one series of openings or perforations 93 has been shown in the support or apron 87, I propose to use two series or sets of said perforations, and to impart an intermittent movement to said support, which will move the same successively and intermittently through a range of movement equivalent to one-half the length thereof. It is obvious, however, that one, or more than two, of said series of perforations 93 may be provided, if desired. In connection with the support or apron 87 I employ a suction-box 94 which communicates with the main suction-pipe 57 through the flexible coupling-piece 95 and the passages 96 and 97. The upper surface of the suction-box 94 is substantially horizontally disposed, and serves as a support for the support or apron 87 which moves thereon. The opposite sides of said suction-box are curved, as shown at 98 and 99, to conform to the curvature of, and to receive, the rollers, 90 and 91, around which the support or apron 87 passes. An opening 100 is formed in the upper wall of the suction-box 94, in which are arranged the parallel wires 101 which extend transversely of the bed of the machine but longitudinally of the suction-box. These wires have their upper edges in the same plane as the upper surface of the imperforate portion of the top of the suction-box 94 and are supported by the slats 102, which are rigidly secured in place and extend at right angles to said wires. By this construction it will be noted that when the perforations 93 in the support or apron 87 are located above the opening 100 in the suction-box 94, the suction in said box 94 may act through said opening 100 and through the perforations 93, to retain in contact with said support or apron the wrapper which is delivered thereto from the roller 34. No sagging or falling of the support or apron can take place opposite the opening 100 in the suction-box, as the same will be supported by the wires 101. Furthermore, by the use of said wires 101 friction between the support or apron 87 and the top wall of the suction-box 94 is reduced to a minimum.

The support or apron 87, the suction-box 94, and the parts above described as coöperating therewith, are mounted to bodily move and are disposed in a longitudinally movable frame 103 which includes the parallel bars 104 projecting from the opposite ends thereof and mounted to slide in bearings in the horizontal bars 105 of the main frame. The underside of the frame 103 is provided with a rack 106 which has meshing therewith a toothed sector or segmental rack 107, on the end of a lever 108 fulcrumed in a bracket 109, and having a tooth or projection 110 on its lower end which moves within a cam groove 111 formed in the periphery of a disk 112 secured to the main drive-shaft. By this construction it will be seen that during the rotation of the main drive-shaft 38, which is constant, the frame 103, on which is mounted the support or apron 87, will be moved longitudinally back and forth of the machine. The speed and regularity of this movement of this frame may be accurately regulated to suit the conditions under which the machine operates by simply varying the shape of the cam groove 111.

I have heretofore stated that an intermittent, irregular movement is imparted to the support or apron 87. One means by which this may be effected will now be described. Secured to the shaft 113 to which the toothed roller 90 is secured, is an irregular gear 114, and meshing with said gear is a pinion 115 mounted in an upwardly-spring-pressed bracket 116, as clearly shown in Fig. 20 of the drawings. The said bracket 116 has the base portion thereof provided with an opening at one end which surrounds a vertical shaft 117 mounted to turn in a horizontal arm 118 on the longitudinally movable frame 103, and acted upon to normally urge the same upwardly by a coil spring 119, which surrounds the shaft 117 and acts upon the upper side of the arm 118 and the under side of the bracket 116. The other end of the base of said bracket 116 moves in coöperation with a guide 120 formed on a vertical portion of the longitudinally movable frame 103. The upper end of the bracket 116 is provided with an overhanging portion 121, which embraces the shaft 117, and secured to the pinion 115 is a bevel-pinion 122. Said bevel-pinion meshes with a similar bevel-pinion 123 splined upon the shaft 117 so that it is capable of longitudinal movement thereon but is turned with said shaft. The said pinion 123 is located between the base of the bracket 116 and the over-hanging portion 121 thereof, and is provided with an elongated hub 124 by means of which the same is held in its raised position, the said hub serving to support the pinion 123 by its engagement with the upper surface of the base of the bracket 116. The lower end of the shaft 117 below the arm 118 of the frame 103 is provided with a bevel-pinion 125, which meshes with a bevel pinion 126 splined upon the counter-shaft 127 parallel to and deriving its motion from the main drive-shaft 38. The said pinion 126 has its hub provided with a groove 128 in which are located the bifurcated ends 129 of a fork secured to and projecting downwardly from the arm 118 of the frame 103.

The fork 129 coöperating with the groove 128 in the pinion 126 prevents binding action between the teeth of the pinions 125 and 126 during the longitudinal movements of the frame 103, and the hub 124 which engages the base of the bracket 116 prevents binding action between the pinions 122 and 123 during the upward and downward movements of the said bracket 116, due to the action of the spring 119 and the irregularities of the gear 114. The main driving shaft 38 is provided at one end with a main driving gear 130, having teeth 131 on its periphery which mesh with the teeth of a pinion 132 loosely mounted on the end of the shaft 127 above referred to. This pinion has secured to the outer projecting end thereof one member 133 of a clutch, the other member 134 of said clutch being secured to the end on the counter-shaft 127. The two members of said clutch are normally held out of engagement with each other by means of a spring 135 which is attached to a collar 136 loosely mounted in an annular groove in the periphery of the pinion 132. The said collar is itself provided with a tooth or projection 137 which moves within a cam groove 138 in the outer periphery of the main driving gear 130. The cam groove 138 is so formed and disposed upon the driving gear 130 that once during each revolution of said driving gear it will act upon the projection 137 to throw outwardly the clutch member 133 into engagement with the clutch member 134. When this takes place the counter-shaft 127 will be rotated, due to the fact that the pinion 132 is constantly in mesh with the teeth 131 of said driving gear. At the same time, through the pinions 126, 125, 123, 122, and 115, the motion of said shaft will be transmitted to the irregular gear 114. Constant contact between the pinion 115 and the irregular gear 114 is maintained by the provision of the spring 119, which acts upon the under side of the bracket 116 in which said pinion 115 is mounted.

While the pinion 115 is in motion, its speed of rotation is constant, but as it acts upon the irregular gear 114 it will impart to the shaft 113, to which said irregular gear is secured, an irregular movement. That is to say, when contact is had between the pinion 115 and those portions of the gear 114 which are nearest the axis of said gear, a more rapid rotation of the shaft 113 will be effected than when said pinion 115 is in contact with those portions of the gear 114 which are farther removed from its axis. It will be noted from the foregoing that the frame 103 may be moved longitudinally in either direction without disturbing the gearing described, as the pinion 126 has a connection with countershaft 127 which provides for its sliding movement thereon, and it will also be noted that after the clutch member 133 is removed from its engagement with the clutch member 134 the rotation of the counter-shaft 127 will be stopped, and the movement of shaft 113, and consequently of the support or apron 87, will be stopped. By simple mechanism, therefore, I provide for the intermittent operation of the support or apron 87 and for the irregular movement of the same while it is in operation. Of course the extent or degree of this irregular movement of the support or apron, and the time when the speed is to be increased or decreased may be readily and accurately controlled by changing the shape of the irregular gear 114, by which said irregular movement is effected.

I have shown but one way of effecting the variable, intermittent movements of the support or apron 87, but do not limit myself to the specific means described. My invention contemplates and includes any suitable mechanism by which an irregular or variable movement may be imparted to the support or apron and any suitable means whereby such movement may be made intermittently.

Adjacent to the delivery-end of the support or apron 87 and slightly below the roller 91 around which said support or apron passes are the wrapper-applying-rolls 139 and 140. Five of such rolls have been shown, and I prefer to use this number, although any suitable number may be used. These rolls are arranged in a cluster with a space at the center thereof for the reception of the bunch 141 to which a wrapper from the carrier 87 is to be applied. Each of said rollers is made up of a rigid core 142 of metal or other suitable material, which is bent or curved to conform to the shape of the cigar being made, but is provided with a straight portion adjacent to one end. Surrounding the straight portion of each of the cores 142 is a tube or sleeve 143 having a pinion 144 thereon. Secured to the sleeve 143 of each of said rolls and surrounding the core 142 are two coil springs 145, 146. The spring 145 is located within the spring 146 and moves in contact with the curved portion of the core 142. As both of said springs, however, are secured to the sleeve 143 they are, during the rotation of said sleeve, rotated together about the core 142. Secured to and surrounding the outer spring 146 is a tubular covering 147 of rubber or other like yielding material. This cover 147 constitutes the working face of each of the wrapper-applying-rolls, and being of yielding material itself, and being mounted upon the two yielding springs 145 and 146, it constitutes a working surface well adapted to the purpose for which it is designed. The cores 142 of the rolls 139 are immovable, being secured at their opposite ends respectively to the main frame and to the heading jaw 148, which is bolted or otherwise secured to said main frame. The cores 142 of the rolls 140, on the other hand, are capable of bodily movement toward and away from the rolls 139, the latter cores being secured at their opposite ends respectively to the movable jaws 149 and 150. The movable jaw 149 constitutes one of the heading jaws, being located opposite to and cooperating with the fixed heading jaw 148. The jaws 149 and 150 are secured to a shaft 151 extending longitudinally of the machine and mounted in fixed bearings on the main frame. To the shaft 151 is secured a crank-arm 152, which is provided at its free end with the pin or projection 153 fitting within a cam groove 154 in the main driving gear 130. The cam groove 154 is so formed that throughout the greater portion of its length it will act to retain the movable jaws 149 and 150 in their innermost positions, with the rolls 140 carried thereby in the positions shown in Figs. 8, 11 and 13 of the drawings. It is, however, provided at one point with an eccentric portion, which, when the same moves in contact with the pin 153, serves to rock the arm 152 and the shaft 151, to throw the jaws 149 and 150 outwardly, and separate the rolls 140 from the rolls 139, as shown in Fig. 12 of the drawings.

When the rolls 140 are separated from the rolls 139 the completed cigar or the wrapped bunch 141 automatically falls by gravity from between the wrapper-applying-rolls, and a new bunch for the next cigar to be made is introduced by hand between the wrapper-applying-rolls. The outer portions or covers of the wrapper-applying-rolls 139, 140 are rotated upon their respective cores direct from the driving gear 130, which has meshing with it a pinion 155 secured to the end of a longitudinally extending shaft 156. The said shaft 156 is provided with a preferably cone-shaped pinion 157 which constantly meshes with the pinions 144 of the three rolls 139, and is adapted to mesh with the pinions 144 of the bodily movable rolls 140. When said wrapper-applying-rolls are in their operative positions, therefore, all of the same are rotated simultaneously and in the same direction. The shaft 156 is mounted in suitable bearings in the main frame and has upon its extreme inner end, within the various wrapper-applying-rolls, a cutter 158 designed for the purpose of severing any projecting portions of the wrapper at the tuck of the cigar. This cutter 158 may be of any suitable form and construction. I have, however, shown the same in the form of a sleeve, secured to the shaft 156 and having an annular projecting cutting edge designed to move in contact with the inner wall of one of the wrapper-applying-rolls. To accomplish this result, one of said wrapper-applying-rolls will be bent inwardly opposite the cutter 158 to a greater extent than the others.

In connection with the wrapper-applying-rolls and the means for delivering the wrapper to said rolls, which have been described above, I employ a tucking needle 159, designed to engage the forward end of the wrapper as it is delivered from the carrier or apron 87 to move the same downwardly in contact with the bunch 141 within the wrapper-applying-rolls and to retain the same in contact with said bunch until more than one revolution of the latter has been effected by said wrapper-applying-rolls. To accomplish this result, it is necessary that means be provided for imparting to said needle a vibratory movement, a longitudinal movement, and a revolving movement. The means provided by me for this purpose consists of a bar 160 mounted to slide longitudinally in suitable guide-ways in the main frame, and provided at one end with a tooth or pin 161 fitting within a cam groove 162 in the main driving gear 130, through which cam groove and pin a longitudinal movement may be imparted to said bar. The bar 160 has mounted for independent longitudinal movement on the under side thereof, a slide 163, the same being provided at one end with a pin 164 which fits within a cam groove 165 in the main driving gear 130. As one means of mounting the slide 163 on the bar 160, I form in the under side of said bar a dove-tailed groove 166 in which a correspondingly-shaped portion of the slide 163 fits. The said slide 163 is therefore supported from and by the bar 160, and is capable of longitudinal movement independent of said bar. The cam grooves 162 and 165 in the main driving gear 130 are so formed and disposed that during the rotation of said gear in the direction of the arrow shown in Fig. 2 of the drawings, said grooves will first act upon the pins 161 and 165 simultaneously so as to move both the bar 160 and the slide 163 outwardly or toward the support 87 at the same time. These parts will also be held by said cam grooves outwardly and together at the same time. As the rotation of the gear 130 proceeds, however, the incline 166 in the groove 165 will act upon the pin 164 before the incline 167 in the groove 162 acts upon the pin 161. The result is that the slide 163 will be drawn back to its normal retracted position prior to the bar 160. The bar 160 has secured to it and extending upwardly therefrom a bearing-block or support 168 in which is mounted the rock-shaft 169, the same extending at right angles to the bar 160 toward the shaft 156 heretofore referred to. The said rock-shaft is provided at a point intermediate its ends with flattened portion 170, which is embraced by the branches of a fork 171 formed upon the upper end of an arm 172 secured to the slide 163, as clearly shown in Figs. 18 and 19 of the drawings. By this construction it will be seen that when the bar 160 and the slide 163 are moved longitudinally independently of each other, a rocking movement will be imparted to the shaft 169. To provide an additional support and bearing for the shaft 169 beyond the block 168, I secure to said block a bracket or rod 173 which extends outwardly therefrom, and is formed with an arm 174 through which the shaft 169 passes and in which it is supported. The outer end of the rock-shaft 169 is formed or provided with a two-part strap or fork 175 in which is supported and mounted to turn the disk or collar 176, to which the tucking needle 159 is secured. The said disk or collar 176 is provided with an elongated or elliptical opening 177 through which a sleeve 178, loose upon the shaft 156, passes. The said disk or collar 176 is pivoted to the sleeve 178, as shown in Fig. 19, the pivot 179 therefor extending from the centers of the elongated sides of the slot 177. It will thus be seen that when the shaft 169 is rocked in its bearing in one direction or the other, the disk 176 carrying the needle 159 will also be rocked on its pivot 179, the elongated slot 177 providing for this rocking movement of said disk without interference with the shaft 156 or the sleeve 178 thereon.

The disk 176 surrounds the shaft 156 at a point between the cutter 158 and the pinion 157 on said shaft. Located between the disk 176 and the cutter 158, and secured to the shaft 156, is a continuously rotating needle-rotator 180, the same being shown in the form of a disk or wheel having a notch or recess 181 at one point in its periphery. Coöperating with the needle-rotator 180 is a needle-guide 182, the same being provided with a substantially circular portion 183 at its lower end which embraces the disk 180, and having an elongated inverted U-shaped contracted portion 184 at its upper end. The said guide is supported and prevented from turning movement by means of a rod 185, which is secured to a portion of the frame of the machine. Now, the normal positions of the different parts above referred to, when the pins or teeth 161 and 164, are in the main portions of the cam grooves 162 and 165 respectively, are as shown in Figs. 18 and 19 of the drawings. That is to say, the needle 159 is raised and the free end of said needle is withdrawn from the tuck-end of the bunch 141 within the wrapper-applying-rolls 139 and 140. As the support or apron 87, however, begins to deliver a wrapper over the roller 91, the cam grooves 162 and 165 act upon the pins 161 and 164, to move the bar 160 and the slide 163 outwardly toward the wrapper-applying-rolls simultaneously. During this operation the needle 159 is moved longitudinally while still in elevated position to a point in which the free end thereof lies above the projecting end of the wrapper and above the tuck-end of the bunch. The relative positions of the wrapper and of the needle 159 at this time are illustrated in Fig. 10 of the drawings. When the needle is raised it lies within the contracted portion 184 of the needle-guide 182. The continued rotation of the driving gear 130, when the parts are in the positions above described, will bring the incline 166 of the cam groove 165 into engagement with the pin 164, and retract the slide 163 independently of the bar 160. This action, through the forked bracket or arm 172, which is connected with the slide 163 and is in engagement with the flattened portion 170 of the rock-shaft 169, will serve to turn said shaft in its bearings and throw the free end of the needle 159 downwardly. When said needle is moved downwardly, it carries with it the projecting end of the wrapper which is being delivered from the carrier 87, and forces the same into contact with the tuck end of the bunch 141. The needle remains in this position until something more than one rotation of the bunch 141 takes place, in order that the wrapper may completely encircle the bunch and thereafter be able to hold itself in place thereon. In order that said needle may remain in contact with the wrapper and hold the same in contact with the bunch 141 while the latter is rotating, said needle must rotate or revolve with said bunch. This movement of the needle is effected by the needle rotator 180, which, as heretofore stated, is secured to the rotating shaft 156. When said needle is depressed or moved downwardly in the manner just described, it seats itself within the notch 181 of the rotator 180, and is then turned by the latter. This revolving movement of the needle is permitted by reason of the fact that the disk 176 to which said needle is secured, is mounted to turn in the strap 175, and by reason of the fact that the sleeve 178, to which the disk 176 is pivoted, is loosely mounted on the shaft 156. Turning or revolving movement of the needle 159 is prevented when the same is in its raised position by the engagement of the same with the contracted portion 184 of the needle-guide 182. When in its depressed position, however, the circular portion of said guide serves to retain the needle in place within the notch 181, and in contact with the end of the wrapper on the bunch. After the bunch has been turned something over one complete revolution, and the wrapper has become fastened thereto independently of the needle 159, the incline 167 on the driving gear 130 comes in contact with the pin 161 on the end of the bar 160, and serves to retract said bar or move the same toward said driving gear. As the rock-shaft 169 is connected through the block 168 with the bar 160, and as the needle 159 is connected through the disk 176 and the strap 175 with said rock-shaft, when the bar 160 is moved in the direction thus described it will carry with it the needle 159, moving the same away from the tuck end of the cigar in course of being wrapped. It will thus be seen that when the end of a wrapper is being delivered to the wrapper-applying-rolls, the needle 159 in its raised position is first moved outwardly toward the bunch, is then depressed so as to force the end of the wrapper into contact with the bunch, is then revolved with the bunch while still in contact with the wrapper until said bunch has been turned more than one complete revolution, and is finally withdrawn from the wrapper and bunch in a direct longitudinal line so as to prevent the breaking or cracking of the wrapper.

The stationary jaw 148 which I have heretofore referred to as a heading jaw, is provided with a cutter 186, and the movable heading jaw 149 is provided with a cutter 187, which coöperates with the cutter 186. These cutters are provided for the purpose of clipping the head of a cheroot or for severing from the pointed head of a cigar the projecting portions of the wrapper at this point. The said cutters are provided with openings 188 which register with each other when the jaw 149 is in its closed position, and which lie in line with the axis of the bunch 141 at the head thereof. When the jaw 149 is separated from the jaw 148 by the means heretofore described, just prior to the automatic delivery of the completed cigar, the cutting edges of the cutters 186 and 187, which are formed around the openings 188, are brought into coöperative relation to each other and serve to sever the projecting end of the wrapper from the cigar, or to cut the head in the formation of a cheroot. The diameter of the openings 188 will vary according to the character of the cut to be made. For example, if it is desired to clip off the head of the product to form a cheroot, the openings 188 will be of comparatively large size, whereas if it be desired merely to sever the projecting end of the wrapper from the head of a cigar, the openings 188 will be exceedingly small. This, however, is a mere detail of construction.

Mounted at any suitable point on the frame of the machine is a paste cup 189, leading from which is a pipe 190 which communicates with a pipe 191 leading to and through the heading jaw 148, as clearly shown. This connection between the paste cup and the heading jaw is for the purpose of supplying paste at the head end of the bunch, for the purpose of securing the wrapper in place at that point. In order to provide a positive feed of the paste to the jaw 148 through the pipe 191, I mount in said pipe a plunger 192, which is adapted to be moved back and forth across the point of intersection of the pipes 190 and 191. This plunger is secured to an arm 193, connected with the bar 160 heretofore referred to. The said bar 160, it will be remembered, has imparted to it an intermittent, longitudinal movement. During this movement of said bar, the plunger 192 will be reciprocated back and forth in the pipe 191 in a manner readily understood. The pipe 190 is slightly inclined from the paste cup 189 to its point of connection with the pipe 191, so that there will be a constant flow of paste from said cup to the pipe 191. The paste is free to enter the latter pipe 191 when the plunger 192 is in its retracted position, as shown in Fig. 16 of the drawings. When said plunger is moved in the opposite direction, however, it will carry with it the paste which had previously entered said pipe 191, and force the same through the latter pipe to the jaw 148, through which it is delivered to the head end of the bunch. A positive and intermittent supply of paste is thus delivered to the bunch. In order to regulate the quantity of paste delivered by the plunger 192, I provide means for adjusting the position of said plunger in the arm 193, so as to regulate the stroke thereof. The plunger 192 is provided with screw-threads 194 which mesh with corresponding screw-threads in the arm 193, and is also provided with a polygonal head 195, by which it may be turned through the medium of a wrench or key. On the screw-threads 194 between the head 195 and the arm 193 is a lock-nut 196. By this construction it will be obvious that by loosening the lock-nut 196 the plunger 192 may be turned in the arm 193, so as to cause the same to move toward or away from the end of the pipe 191. When adjusted forwardly or toward the end of the pipe 191, it will be seen that the head of the plunger will, during the operation of the bar 160, be moved to a greater distance beyond the point of connection of the pipe 190 with said pipe 191. Consequently an increased supply of paste will be delivered to the jaw 148. When the plunger 192 is adjusted in the opposite direction, however, it will, during the operation of the bar 160, be moved to a less degree beyond the point of intersection of the pipe 190 and the pipe 191, and consequently a less supply of paste will be delivered to the jaw 148.

Prior to the operation of the machine it will be understood, of course, that the cutting edge of the die 16 will be made to correspond with the size and shape of the wrapper to be formed. The outer contour of the series of perforations 93 in the support or apron 87 will also be made to correspond to the shape of the die 16. These perforations 93 will be so arranged in the apron 87 that when said support or apron is at rest during the periods between the intermittent movements of the same, the forward edge of the series of perforations 93 will lie adjacent to that portion of the support or apron 87 which passes around the roller 91. The member or roller 34 has the series of perforations 37 therein so arranged that when it is moved over the support or apron 87, said series of perforations will exactly register with the series of perforations 93. To properly effect this result, it is generally advisable to form the perforations 37 in the member or roller 34 after the perforations 93 have been formed in the support or apron 87, and after said support or apron has been moved to the position shown in Fig. 2 of the drawings, for it will be readily understood that no relative adjustment of these two parts can afterward be made. The die 16 then has its position adjusted so that the cutting edge thereof will register with the outer edges of the series of perforations 37 in the member or roller 34 when the latter is moved over said die. To effect this result said die is mounted for longitudinal, lateral, and axial adjustment on the bed of the machine, and the same is also adapted to have the plane of its cutting edge adjusted so that all portions thereof will be engaged by the surface of the member or roller 34 when the latter moves over it. It will be understood that the member or roller for removing the wrapper will operate with any suitable means for holding a wrapper in position to be picked up, although illustrated in connection with a die on which the wrapper is cut and from which it is picked up.

During the operation of the machine, the drive-shaft 38 is continuously rotated from any suitable source of power, and by the means heretofore described a continuous revolving movement is imparted to the member or roller 34 from said drive-shaft. Said member or roller is thus caused to pass successively over the die 16 and the support or apron 87. While passing over said die and over said support or apron, a rotary or axial turning movement is imparted to said member or roller. Just before the member or roller 34 reaches the die 16, a tobacco leaf is placed upon the die 16 by the operator and the treadle 70 is depressed, which action opens the valve 63, and permits the suction to act upon the under side of said leaf, through the perforations 22 in the die-bed 21. The said leaf is thereby firmly held in place upon the die. The degree of suction may be accurately controlled by opening the valve 63 to a greater or less extent. As a matter of fact, while the member or roller 34 is passing over said die, the valve 63 is but partially open, so that the suction acting upon the under side of the leaf is less than that acting within the member or roller 34. The said member or roller 34 upon reaching the die 16 coöperates with the cutting edge thereof to sever the leaf along said cutting edge to produce a wrapper of the desired shape. At the same time, it lifts the wrapper as it is cut from the die 16, the same being caused to adhere to said roller by reason of the fact that the suction within said roller is greater than that within said die. While passing over said die, the pinion 50 on the stem 48 of the member or roller 34 is in mesh with the teeth of the mutilated gear 49, and an axial turning movement is imparted to said member or roller. This turning movement, however, ceases as soon as the member or roller 34 passes from the end of the die 16, as at that time the pinion 50 passes into the mutilated portion of the gear 49 and the presser-block 53 comes into engagement with the flattened portion of the collar 52. During this time the suction from the main suction-pipe 57 is acting through the flexible coupling-piece 95 and the suction-box 94 upon the under side of the carrier or apron 87.

As the member or roller 34 continues its revolving movement from the die 16 to the support or apron 87, with the wrapper adhering to the surface thereof, the suction within said member or roller 34 is automatically decreased by reason of the fact that the roller 84 on the lever 82, moving in contact with the lower portion of the cam 85, is drawn inwardly by the spring 86, and the valve 79 is moved toward the tube 78, through which the suction passes to the inside of the stem 48, and thence through the perforations 77 to the inside of the member or roller 34. When said member or roller 34 reaches the support 87, therefore, the force of the suction beneath said support is greater than that within said member or roller. Consequently when contact takes place between the member or roller 34 and the support 87, or rather between the wrapper on said member or roller 34 and said support, the said wrapper is stripped from the member or roller 34, through the action of the suction beneath the support 87 which is of greater force than that within the member or roller 34. The result is that after said member or roller passes beyond the support 87, the wrapper will have been removed therefrom, and will be found adhering to the carrier 87, with the outer edges thereof registering with the outer edges of the series of perforations 93. At this time, the progressive or forward movement of the support or apron 87 toward the wrapper-applying rolls 139 and 140 is started up. This is effected by the clutch member 133 being moved outwardly on the countershaft 127 into engagement with the clutch member 134, due to the fact that the pin or projection 137 on the collar 136 is engaged by one of the inclines in the cam groove 138. The counter-shaft 127 is thus caused to rotate, and the same transmits its movement to the support 87 through the pinions 126 and 125, the shaft 117, the pinions 123 and 122, and the pinion 115, which is retained in constant yielding engagement with the irregular gear 114, which is secured to the shaft 113, to which the driving roller 90 for the support 87 is secured. This forward movement of the support is continued until the clutch members 133 and 134 are separated from each other, which separation is designed to take place when the support 87 has moved a distance equal to one-half its total length. The said movement of the support 87 is effected at an irregular speed, due to the fact that it is driven from the irregular gear 114, which irregular speed of movement is designed for the purpose of enabling the wrapper to be fed to the bunch in such manner that it may be wrapped smoothly and evenly thereon. That is to say, when the wrapper is being applied to a narrow portion of the cigar, its speed will be comparatively slow, whereas, when it is being applied to a thick portion of the cigar, it will be more rapid.

It will be noted that when the support 87 with a wrapper adhering to its upper surface is started, the wrapper will be delivered at varying speeds over the roller 91 to the wrapper-applying-rolls 139, 140. At first the forward end of the wrapper is delivered from the end of the carrier 87, and as the support continues its movement, the whole of the wrapper is finally discharged from the upper surface thereof. As soon, however, as a portion of the wrapper passes from the support over the roller 91, that portion is immediately released and rendered free, due to the fact that the suction from the suction-box 94 is cut off therefrom. The suction remains in force on the rest of the wrapper, and holds the same in firm contact with the support 87 until it passes over the roller 91. As long as any portion of the wrapper, therefore, remains upon the upper surface of the support, it is held firmly in place, but as soon as any portion of the wrapper passes from the end of said support, it is relieved from the suction in suction-box 94, and free to be operated upon by the other mechanisms. This is an important feature in the construction and operation of my machine.

When the end of a wrapper is delivered from the support 87 over the roller 91, it is at once acted upon by the tucking needle 159, which at this time is in its forward position, as shown in Figs. 10, 14, and 15 of the drawings. The free end of said needle is moved downwardly by the engagement of the incline 166 of the cam groove 165 with the pin or projection 164 on the slide 163, which action retracts said slide 163 independently of the bar 160, and through the forked bracket arm 172 rocks the shaft 169. The end of the wrapper is thereby moved down into contact with the bunch 141, and the same is held in contact with said bunch until the latter has been turned something more than one complete revolution, by reason of the fact that the needle 159, while still in its forward position, is revolved about the bunch. This revolving action of the needle is effected by the needle rotator 180, which is secured to the shaft 156, and is provided with a notch or recess 181 in which said needle is seated when the same is moved downwardly by the means above referred to. When the wrapper has been wrapped a little more than once around the bunch 141 at the tuck of the cigar, so that thereafter it may retain itself in place upon said bunch, the needle 159 is moved bodily outward away from said bunch in a direct longitudinal line by the engagement of the incline 167 of the cam groove 162 with the pin or projection 161 on the bar 160, which action moves said bar and the needle 159 which is indirectly connected therewith toward the main driving gear 130. The wrapper has now been started upon the bunch 141, but it is necessary to do more than merely deliver said wrapper in a direct line with the support 87 thereto. It is necessary that the angle of presentation of the wrapper to the bunch be varied in accordance with the particular shape of the cigar in course of manufacture. This variation in the angle of presentation of the wrapper to the bunch is effected by the bodily movement of the wrapper support frame 103 longitudinally of the main frame, in connection with the progressive, intermittent, irregular movement of the support 87 itself. As heretofore stated, the frame 103 has longitudinal movement imparted to it by the cam groove 111 in the periphery of the disk 112, secured to the main drive-shaft 38, and the lever 108, which has a pin 110 fitting within the groove 111, and has a segmental gear 107 at its upper end, which meshes with a rack 106 on the frame 103. The said cam groove 111 is so shaped and arranged upon the disk 112 that when the support 87 first begins its progressive movement, it will move the lever 108 so as to project the frame 103 forwardly or toward the main driving gear 130 until the tuck of the cigar has been formed and the needle 159 is withdrawn from the bunch and the wrapper on the end thereof. Said cam groove then acts upon the lever 108 to move the frame 103 longitudinally in the opposite direction. The degree and speed of said movement is variable and is determined by the shape of the cigar being formed.

The angular presentation of the wrapper to the rotating bunch is controlled by the movement of the frame 103 longitudinally of the wrapper applying mechanism, and the speed of movement of this frame and the feeding belt or wrapper feeder carried by the frame is controlled or varied by the configuration of the cam race 111 in the cam 112, the illustration given being sufficient to indicate variation in the speed of movement of the frame and the apron, support or wrapper feeder carried by it. It will be observed that the cam race or groove 111 is curved, and this curvature causes a variation of movement or swing of the arm 108, and through this arm a similar variation of movement is imparted to the frame 103. The wrapper applying mechanism of this machine, or the means controlling the winding of a wrapper around a cigar bunch is illustrated and explained as comprising a plurality of rolls, a part of which are carried by an opening and closing jaw, but it should be understood that the machine is not limited in its practical operation to this precise form of wrapper applying mechanism. With the wrapper applying mechanism means for feeding a wrapper thereto and operating to project successive portions beyond the said feeding means is used so that the wrapper will be introduced into the wrapper applying mechanism without the exertion of drawing tension on the wrapper by the rolls of the wrapper applying mechanism and as an effective auxiliary the feeding means, feeder, or feeding device controlling the delivery of the wrapper into the wrapper applying mechanism is preferably subjected to suction action, as hereinbefore explained. Furthermore, the wrapper is fed to the wrapper applying mechanism by a movement independent of the movement of the wrapper applying mechanism in contradistinction to a drag feed from the support for the wrapper, or in the present instance the wrapper is moved by a portion of the support from the surface of the latter, or the carrying surface of the support changes from one plane to another to progressively present the wrapper into delivery position to the wrapper applying mechanism. Hence the wrapping mechanism of this machine, as shown, includes not only wrapping rollers but also a feed belt and devices for transferring the wrapper from the support for the wrapper to the wrapping apparatus feed belt and also a device for holding the free end of the wrapper while it is wound around the bunch. This altogether constitutes the wrapping apparatus of the machine. It may well be that wrapping mechanism in a bunch wrapping machine may be made with less than so many unitary parts as just specified. Also, it may be that the wrapper supporting and presenting and delivering devices may present and deliver the wrapper to different unitary parts of the wrapping mechanism. Consequently, this machine is not limited in the least to any specific wrapping apparatus, nor to the presentation or delivery of the wrapper to any particular unit of the wrapping apparatus.

The object of this means for varying the angle of presentation of the wrapper to the bunch is to enable the wrapper to be applied evenly and smoothly to those portions of the bunch which are tapering or increasing or decreasing in size. For example, if a cigar of the "perfecto" type is being made, in which both the tuck and the head are pointed, it will be necessary after the wrapper has been applied a little more than once around the tuck end of the cigar to move the frame 103 outwardly or away from the driving gear 130 until the maximum thickness of the cigar has been reached. Then the frame 103 will necessarily be moved in the opposite direction to apply the wrapper to the tapering end of the cigar extending from the point of its maximum thickness to the head. Of course, if a cigar is being formed in which a portion of the same is cylindrical, it will be unnecessary to move the frame 103 longitudinally while the wrapper is being applied to said cylindrical portion. The extent, time and direction of movement of the frame 103 may be varied to suit any particular shape of cigar being made, by simply changing the configuration of the cam groove 111 in the disk 112.

It has heretofore been stated that the shaft 156 is continuously rotated from the main driving gear 130 through the pinion 155, which is secured to said shaft and meshes with said driving gear. This shaft 156, through the pinion 157 thereon, serves to impart to the wrapper-applying rolls 139 and 140 a rotary movement, through the engagement of said pinion with the pinions 144 on said rolls. While the wrapper is being delivered from the support 87 to the bunch 141, therefore, the said rolls 139 and 140 are continuously rotating, and impart a similar rotation to the bunch 141 located within the same. When, however, the wrapper has been applied to all portions of the cigar, including the head, one of the inclines in the cam groove 154 is brought into engagement with the pin 153 on the crank 152 secured to the shaft 151, to which the movable jaws 149 and 150 are connected, with the result that said shaft is rocked and said jaws 149 and 150 with the rolls 140 carried thereby are separated from the rolls 139. The cutters 186 and 187 are thereby operated, the projecting end of the wrapper at the head of the cigar, or the head itself, is clipped from the body of the cigar, and the completed product is allowed to fall by gravity from within the rolls 139 and 140 into a suitable receptacle designed to receive the same.

From the foregoing description it will be observed that I have produced a machine which is entirely automatic in its action except for the hand manipulation necessary in placing the tobacco leaf upon the die 16, in placing the bunch within the wrapper-applying rolls 139, 140, and in operating the valve 63. All the other operations of cutting the wrapper, lifting the same from the cutting die, regulating the tension of the suction in the member or roller 34, delivering the wrapper from the member or roller to the support or apron 87, imparting to said support an intermittent, irregular movement toward the wrapper-applying rolls, and an irregular bodily movement in the direction of the length of said rolls, advancing, lowering, revolving, and retracting the tucking needle for the purpose of applying the wrapper to the tuck end of the cigar, rotating the wrapper-applying rolls and actuating the cutters for the head of the cigar, as well as cutting the projecting portions of the wrapper at the tuck of the cigar, and applying paste to the bunch at the head of the cigar, are performed entirely by the machine itself, irrespective of any action on the part of the operator.

The wrapper-applying rolls 139, 140, are preferably formed with roughened outer surfaces, so as to provide means for positively applying the wrapper to the bunch 141 without slipping. This roughening of the surfaces of said rolls may be produced by corrugating the same as shown, which corrugations may extend throughout the length of the rolls or be located only at the tuck end thereof. When said corrugations are located only at the tuck end of the rolls, they will serve to crimp the wrapper on the bunch in imitation of a Spanish hand-made cigar.

It is obvious of course that the wrapper-carrier 87 and the parts coöperating therewith may be employed upon cigar machines of other construction than that herein shown, for the purpose of receiving a cut wrapper from any source and delivering the same to the forming mechanism.

Having now described my invention, what I claim as new, and desire to secure by Letters-Patent, is:

1. In a cigar machine, the combination with wrapper applying mechanism, of a traveling apron constituting a wrapper-feeder or presenting means, having perforations therein, rollers around which said apron passes, teeth on one of said rollers adapted to fit within the perforations in said apron, and means for imparting a variable speed of rotation to said rollers.

2. In a cigar machine, the combination with the main driving gear and wrapper applying mechanism, of a traveling apron constituting a wrapper-feeder or presenting means, rollers around which said apron passes, and from which it derives its movement toward said wrapper applying mechanism, a shaft to which one of said rollers is secured, an irregular gear secured to said shaft, and operative connections between said driving gear and said irregular gear whereby a variable speed of movement is imparted to said carrier.

3. In a cigar machine, the combination with the main driving gear and wrapper applying mechanism, of a traveling apron constituting a wrapper-feeder or presenting means, rollers around which said apron passes, and from which it derives its movement toward said wrapper applying mechanism, a shaft to which one of said rollers is secured, an irregular gear secured to said shaft, operative connections between said driving gear and said irregular gear, and means for automatically throwing said connections intermittently into and out of operation.

4. In a cigar machine, the combination with the main driving gear and wrapper applying mechanism, of a traveling apron constituting a wrapper feeder or presenting means, rollers around which said apron passes, and from which it derives its movement toward said wrapper applying mechanism, a shaft to which one of said rollers is secured, an irregular gear secured to said shaft, operative connections between said driving gear and said irregular gear, a clutch for intermittently throwing said connections into and out of operation, and means for automatically actuating said clutch.

5. In a cigar machine, the combination with the main driving gear and wrapper applying mechanism, of a traveling apron constituting a wrapper-carrier, rollers around which said apron passes, and from which it derives its movement toward said wrapper applying mechanism, a shaft to which one of said rollers is secured, an irregular gear secured to said shaft, operative connections between said driving gear and said irregular gear, a clutch for intermittently throwing said connections into and out of operation, a cam on said driving gear, and connections between said cam and one of the members of said clutch for automatically throwing the same into and out of operative relation with the other member of said clutch.

6. In a cigar machine, the combination with the main driving gear and wrapper applying mechanism, of a traveling apron constituting a wrapper-carrier, rollers around which said apron passes, and from which it derives its movement toward said wrapper-applying mechanism, an irregular gear secured to one of said rollers, operative connections between said driving gear and said irregular gear, including a pinion which meshes with said irregular gear, a movable bracket or frame in which said pinion is mounted, and a spring acting upon said frame for retaining said pinion in constant engagement with said irregular gear.

7. In a cigar machine, the combination with a main drive shaft, a driving gear thereon having a cam groove therein, and wrapper applying mechanism, of a traveling apron constituting a wrapper-feeder or presenting means, rollers around which said apron passes, and from which it derives its movement toward said wrapper-applying mechanism, an irregular gear secured to one of said rollers, a counter-shaft, a clutch, one member of which is secured to said counter-shaft, a pinion loosely mounted on said counter-shaft meshing with said driving gear and carrying the other member of said clutch, a collar loosely mounted on said pinion and having projection thereon which fits within said cam groove, a spring connected with said pinion for normally retaining said clutch members out of engagement with each other, operative connections between said counter-shaft and said irregular gear, including a pinion which meshes with said irregular gear, a movable bracket or frame in which the latter pinion is mounted, and a spring acting upon said frame for retaining the pinion carried thereby in constant engagement with said irregular gear.

8. In a cigar machine, the combination with a drive shaft, a driving gear thereon, and wrapper applying mechanism, of a frame, connections between said drive-shaft and said frame for imparting to the latter a movement in the direction of the length of said wrapper applying mechanism, a wrapper-feeder carried by said frame, rollers around which said feeder passes and from which it derives its movement toward said wrapper-applying mechanism, an irregular gear secured to one of said rollers, a counter-shaft adapted to be rotated from said driving gear, operative connections between said counter-shaft and said irregular gear, including a pinion rotatable by and having a sliding connection on said counter-shaft, and a pinion meshing with said irregular gear, a movable bracket in which the latter pinion is mounted, and a spring acting upon said bracket for retaining the latter in constant engagement with said irregular gear.

9. In a cigar machine, the combination with wrapper-applying mechanism and means for delivering a wrapper thereto, of a tucking needle, a needle-guide having a contracted portion and a circular portion communicating therewith, a needle-rotator mounted to turn in the circular portion of said guide and provided with a notch in its periphery for the reception of said needle, means for moving said needle in raised position toward the wrapper-applying mechanism in the contracted portion of said guide as the fore end of the wrapper is being delivered, means for automatically depressing said needle into the notch of said rotator to force the end of the wrapper into contact with the bunch, and means for retracting said needle longitudinally when the bunch has made more than one complete turn.

10. In a cigar machine, the combination with wrapper-applying mechanism and means for delivering a wrapper thereto, of a rotary shaft, a needle rotator secured thereto, a sleeve loosely mounted on said shaft, a disk pivotally connected with said sleeve and having an elongated slot therein through which said sleeve passes, a tucking needle secured to said disk, a rock-shaft having a forked end in which said disk is mounted to turn, means for automatically moving said rock-shaft bodily longitudinally of the wrapper-applying mechanism, to cause said needle to approach said wrapper-applying mechanism as the fore end of the wrapper is being delivered, means for automatically rocking said shaft to swing said disk on its pivot and depress said needle, to move the same into engagement with said rotator and to force the end of the wrapper into contact with the bunch, whereby said needle and the disk to which it is secured are revolved by said rotator, and means for automatically retracting said rock-shaft and thereby separating said needle from the bunch when the latter has been rotated more than one complete turn.

11. In a cigar machine, the combination with wrapper-applying mechanism and means for delivering a wrapper thereto, of a rotary shaft, a needle rotator secured thereto, a sleeve loosely mounted on said shaft, a disk pivoted to said sleeve and having an elongated slot therein through which said sleeve passes, a tucking needle secured to said disk, a stationary needle-guide having a contracted portion in which said needle fits when the same is in its raised position, and having a circular portion communicating therewith in which said rotator is mounted to turn, a longitudinally movable bar, a rock-shaft mounted thereon, extending transversely thereof, provided with a forked end in which said disk is mounted to turn and having a flattened portion thereon, a slide parallel to said bar and longitudinally movable independently thereof, a bracket having forked arms embracing the flattened portion of said rock-shaft, means for automatically moving said bar and slide together longitudinally of and toward said wrapper applying mechanism, means for automatically retracting said slide independently of said bar for rocking said rock-shaft and depressing said needle, means for automatically retracting said bar for moving said rock-shaft and the needle connected therewith bodily away from said wrapper-applying mechanism.

12. In a cigar machine, the combination with a main driving gear, having a plurality of cam grooves therein, wrapper applying mechanism, and means for delivering a wrapper to said wrapper-applying mechanism, of a rotary shaft driven from said drive-gear, a needle rotator secured to said shaft, a sleeve loosely mounted thereon, a disk pivoted to said sleeve having an elongated slot therein through which said sleeve passes, a tucking needle secured to said disk, a stationary needle-guide having a contracted portion in which said needle fits when in its raised position, and a circular portion communicating therewith in which said rotator is mounted to turn, a bar movable longitudinally of said wrapper-applying mechanism having a projection fitting within one of said cam grooves, a rock-shaft connected with said bar, extending transversely thereof, provided with a fork in which said disk is mounted to turn and having a flattened portion thereon, a slide parallel to said bar longitudinally movable independently thereof, and having a projection thereon which fits within the other of said cam grooves, and a bracket secured to said slide having forked arms thereon embracing the flattened portion of said rock-shaft, the said cam grooves serving to move said bar and said slide together longitudinally of and toward the wrapper-applying mechanism, to then retract said slide independently of said bar, for rocking said rock-shaft and thereby forcing said needle down into contact with the bunch, and afterward to retract said bar, to move said rock-shaft and the needle connected therewith bodily away from said wrapper-applying mechanism.

13. In a cigar machine, the combination with a main driving-gear, having a plurality of cam grooves therein, wrapper-applying mechanism, and means for delivering a wrapper to said wrapper-applying mechanism, of a rotary shaft driven from said drive-gear, a needle rotator secured to said shaft, a sleeve loosely mounted thereon, a disk pivoted to said sleeve having an elongated slot therein through which said sleeve passes, a tucking needle secured to said disk, a stationary needle-guide having a contracted portion in which said needle fits when in its raised position, and a circular portion communicating therewith in which said rotator is mounted to turn, a bar movable longitudinally of said wrapper-applying mechanism having a projection thereon fitting within one of said cam grooves, and having a dove-tailed groove in its lower surface, a block secured to and extending upwardly from said bar, a rock-shaft mounted in said bar extending transversely thereof, provided with a fork in which said disk is mounted to turn, and having a flattened portion thereon, a supporting arm secured to said block and having an opening therein through which said rock-shaft passes, a slide having a dove-tailed portion fitting within the groove in the underside of said bar, longitudinally movable independent of said bar and having a projection thereon which fits within the other of said cam grooves, and a bracket secured to said slide having forked arms thereon embracing the flattened portion of said rock-shaft, the said cam grooves serving to move said bar and said slide together longitudinally of and toward the wrapper-applying mechanism, to then retract said slide independently of said bar, for rocking said shaft and thereby forcing said needle down into contact with the bunch, and afterward to retract said bar, to move said rock-shaft and the needle connected therewith bodily away from said wrapper applying mechanism.

14. The combination with a wrapping mechanism, of a cutting-bed, means for holding a sheet of material thereon, a perforated member operating as a cutting member and a wrapper-support, means for creating suction in the member whereby the cut portion of the sheet is transferred from the bed to the member, means for producing a relative cutting movement between the bed and the member, and means for producing a relative delivery movement between the wrapping mechanism and the member.

15. The combination with a wrapping mechanism, of a cutting-bed, means for holding a sheet of material thereon, a perforated member operating as a cutting device and a wrapper-support, means for creating suction in the member, means for moving the member over the bed to cut a wrapper and pick it up from the bed, and means whereby the member is caused to deliver the wrapper to the wrapping mechanism.

16. The combination with a wrapping mechanism, of a perforated wrapper supporting roller having a supporting means, means for establishing suction in the said roller, means for moving the supporting means and roller into delivery position relatively to the wrapping mechanism, and means for rotating the roller to deliver the wrapper therefrom.

17. The combination with a wrapping mechanism, of a cutting-bed, means for holding material thereon, a coöperating perforated roller, means for creating suction therein, means for moving the roller over the bed to cut and take up a portion of the material therefrom and dispose the cut portion of the wrapper on the wrapping mechanism, and means for positively driving the roller as it moves across the bed.

18. The combination with a wrapping mechanism, of a cutting-bed, means for holding material thereon, a coöperating perforated roller, means for creating suction therein, means for producing a relative cutting movement between the bed and the roller whereby a portion of the material is cut and transferred to the roller, means for positively driving the roller during the cutting movement, and means whereby the roller delivers the cut-out portion of the material to the wrapping mechanism.

19. The combination with a wrapping mechanism, of a perforated wrapper-supporting roller having a carrier, means for establishing suction in the roller, a wrapper supporting device, means for moving the carrier and the roller from the wrapper supporting device into delivery position relatively to the wrapping mechanism, and means for rotating the roller to deliver the wrapper.

20. The combination with a wrapping mechanism, of a cutting-bed, means for holding a sheet of material thereon, a perforated roller operating as a cutting member and a wrapper support, means for creating suction in the roller whereby the cut portion of the sheet is transferred from the bed to the roller, means for producing a relative cutting movement between the bed and the roller, means for moving the roller from the bed to the wrapping mechanism, and means for producing a relative delivery movement between the wrapping mechanism and the roller, substantially as described.

21. The combination with a wrapping mechanism, of a cutting-bed, means for holding a sheet of material thereon, a perforated roller means operating as a cutting member and a wrapper-support, means for creating suction in the roller, means for moving the roller over the bed to cut a wrapper and pick it up from the bed, and means whereby the roller is caused to deliver the wrapper to the wrapping mechanism, substantially as described.

22. The combination with a wrapping mechanism, of a cutting-bed, means for holding material thereon, a perforated coöperating roller, means for creating suction therein, means for producing a relative cutting movement between the bed and roller whereby a portion of the material is cut out and transferred to the roller, means for positively driving the roller during the cutting movement, and means for moving the roller from the bed to the wrapping mechanism.

23. The combination with a wrapping mechanism, of a cutting-bed, means for holding material thereon, a coöperating perforated roller, means for creating suction therein, means for producing a relative cutting movement between the bed and the roller whereby a portion of the material is cut out and transferred to the roller, means for positively driving the roller during the cutting movement, and means whereby the roller delivers the cut-out portion of the material to the wrapping mechanism, substantially as described.

24. In a cigar machine, a hollow wrapper cutting die, means for applying suction to said die for retaining the wrapper in place thereon, a perforated wrapper feeder, means for applying suction thereto, a hollow perforated roller, movable over said die and feeder, means for applying suction to the interior of said roller, and means for automatically increasing the suction in said roller as it passes over said die and decreasing the same as it passes over said feeder.

25. In a cigar machine, a hollow wrapper cutting die, means for applying suction thereto for retaining the wrapper in place thereon, means for varying the suction to said die, a perforated wrapper feeder, means for applying suction thereto, a hollow perforated roller movable over said die and feeder, and means for automatically increasing the suction in said roller as the same passes over said die, and decreasing suction in said roller as it passes over said feeder.

26. In a cigar machine, a wrapper cutting die, a wrapper feeder, a roller, means for revolving said roller over said die and said feeder in contact with the upper surfaces thereof, means for rotating said roller on its axis as it passes over said die and over said feeder, means for arresting the axial movement of said roller as it passes from one of said parts to the other, and means for transferring the wrapper from said die to said roller, and from said roller to said feeder.

27. In a cigar machine, a wrapper cutting die, a wrapper feeder, a roller, a holding device for said roller in which the same is mounted for axial rotation, means for revolving said holding device to move said roller from said die to said feeder in contact with the upper surface thereof, a fixed mutilated gear, a pinion connected with said roller and meshing with said gear, the teeth of said gear being adapted to be engaged by said pinion for rotating said roller on its axis as it passes over said die and over said feeder, a flattened portion on the axis of said roller, and a spring actuated presser block adapted to engage said flattened portion to arrest the axial turning movement of said roller as it passes between said die and said feeder.

28. In a cigar machine, a hollow wrapper cutting die, a valve casing communicating with the inside thereof, a valve in said casing, a perforated wrapper feeding device, a suction box beneath the same, a hollow rotary shaft having two sets of openings in the walls thereof, a fixed sleeve in which said shaft is mounted to turn, a main suction pipe, connections between said suction pipe and box, connections between said suction pipe and said hollow sleeve opposite one set of openings in said hollow shaft, connections between said sleeve, at a point opposite the other set of openings in said hollow shaft, and said valve casing, a perforated roller movable from said die to said wrapper feeding device over the upper surface thereof, a hollow stem for said roller mounted in a bracket secured to said hollow shaft and communicating with the interior of said hollow shaft, and a valve controlling the passage between said hollow shaft and said stem automatically thrown into operation by the rotation of said shaft for varying the suction on the inside of said roller.

29. In a cigar machine, the combination with wrapper applying mechanism, of wrapper feeder means for progressively delivering a wrapper therefrom and by which the wrapper is held at an angle to the bunch, and means for automatically varying the speed of delivery of said wrapper, to compensate for variations in the diameter of the bunch to which the same is applied.

30. In a cigar machine, the combination with wrapper applying mechanism, of wrapper feeder means for intermittently delivering wrappers to said mechanism independently of pulling action of the latter, and means for automatically varying the speed of delivery of the wrappers to said mechanism.

31. In a cigar machine, the combination with wrapper applying mechanism, of wrapper feeder means for intermittently delivering wrappers to said mechanism independently of pulling action of the latter, and for automatically varying the speed of delivery of the wrappers.

32. In a cigar machine, the combination with wrapper applying mechanism, of a wrapper feeding device, operating to project a wrapper therefrom toward said mechanism, means for imparting to said feeding device an intermittent movement at variable speed toward said wrapper applying mechanism to project the wrapper into the latter in accordance with the part of bunch to be wrapped, and means for simultaneously imparting to said feeding device a movement at a variable speed longitudinally of the wrapper applying mechanism.

33. In a cigar machine, the combination with wrapper applying mechanism, of an endless apron constituting a wrapper feeding device, rollers around which said apron passes, and means for imparting to said rollers a variable speed of rotation.

34. In a cigar machine, the combination with wrapper applying mechanism, of a frame movable longitudinally of said wrapper applying mechanism, rollers mounted in said frame, an endless apron constituting a wrapper feeding device passing around said rollers, and deriving its motion from said wrapper applying mechanism, means for automatically imparting to said rollers a variable speed of rotation, and means for simultaneously imparting to said frame a variable longitudinal movement.

35. In a cigar machine, the combination with a main drive shaft having a cam thereon, and wrapper applying mechanism, of a frame movable longitudinally of said wrapper applying mechanism, a wrapper feeding device mounted on said frame and movable toward said wrapper applying mechanism, and connections between said cam and said frame for imparting to the latter a variable movement in the direction of the length of the wrapper applying mechanism.

36. In a cigar machine, the combination with a main drive shaft having a cam thereon, and wrapper applying mechanism, of a frame movable longitudinally of said wrapper applying mechanism having a rack thereon, a wrapper feeding device mounted in said frame, means for moving said wrapper feeding device toward said wrapper applying mechanism, and a gear meshing with said rack and actuated by said cam for imparting a variable longitudinal movement to said frame.

37. In a cigar machine, the combination with a drive shaft having a cam thereon, and wrapper applying mechanism, of a frame movable longitudinally of said wrapper applying mechanism having a rack thereon, a wrapper feeding device mounted in said frame, means for moving said feeding device toward said wrapper applying mechanism, and a lever having a gear thereon meshing with said rack, the said lever being engaged and rocked by said cam, for imparting to said frame a variable longitudinal movement.

38. In a cigar machine, the combination with a drive shaft, a disk thereon having a cam groove therein, a wrapper applying mechanism, of a frame movable longitudinally of said wrapper applying mechanism having a rack thereon, a wrapper feeding device mounted in said frame, means for imparting to said feeding device a movement toward said wrapper applying mechanism, a lever, a gear on said lever meshing with said rack, and a projection on said lever fitting within the cam groove in said disk, whereby a variable longitudinal movement may be imparted to said frame.

39. Wrapper applying mechanism for cigar machines, comprising a cluster of wrapper applying rolls designed to receive within them the cigar bunch, each of said rolls consisting of a central core shaped to conform to the cigar being formed, and having a straight portion thereon, two connected coils of concentric spring wire mounted to turn on said core, one of which coils surrounds the other, a cover of yielding material for the outer of said coils, and a rotary sleeve on the straight portion of said core connected with said coils for rotating them.

40. In a cigar machine, wrapper applying mechanism combined with a suction box having an opening in one wall thereof, wires arranged across said opening with their outer edges in the same plane with the outer surface of the wall of said suction box in which said opening is formed, fixed supports for said wires extending transversely of the same, and a perforated wrapper feeding device movable over said suction box for delivering wrappers to the wrapper applying mechanism.

41. In a cigar machine, wrapper applying mechanism combined with a suction box having an opening in one wall thereof, wires arranged across said opening with their outer edges in the same plane with the outer surface of the wall of said suction box in which said opening is formed, a series of slats secured within said suction box, extending transversely of said wires, and serving as supports therefor, and a perforated wrapper feeding device movable over said suction box for delivering wrappers to the wrapper applying mechanism.

42. In a cigar machine, the combination with wrapper applying mechanism, a perforated wrapper feeding device for delivering the wrappers to the wrapper applying mechanism, means for imparting to said feeding device a variable speed of movement toward the wrapper applying mechanism, means for applying suction to said feeding device to act through the perforations therein upon the wrapper thereon for retaining the latter in place, the perforations of the feeding device terminating in rear of the delivery end of the said feeding device for intercepting the suction from the projecting end of the wrapper as it is discharged from the delivery end of said feeding device.

43. In a cigar machine, the combination with wrapper applying mechanism, a perforated wrapper feeding device for delivering the wrappers to the wrapper applying mechanism, means for automatically imparting to said feeding device an intermittent movement toward the wrapper applying mechanism at a variable speed, a suction chamber for applying suction to said feeding device to act through the perforations therein upon the wrapper thereon for retaining the latter in place, said chamber having a closing end wall at a short distance inwardly from the delivery extremity of the feeding device for intercepting the suction from the projecting end of the wrapper as it is discharged from the delivery end of said feeding device.

44. Wrapper applying mechanism for cigar machines, comprising a cluster of wrapper applying rolls, designed to receive within them a cigar bunch, each of said rolls consisting of a non-rotatable core, one end of which is straight and the other end of which is curved to conform to the shape of the cigar being formed, a sleeve loosely mounted on said core, a pinion on said sleeve, two concentric coils of wire loosely mounted on the curved end of said core and connected with said sleeve, a rubber covering for said coils, and a gear meshing with the pinion on the sleeve of each of said rolls, as and for the purpose set forth.

45. In a cigar machine, a series of wrapper applying rolls designed to receive between them a cigar bunch, each of said rolls consisting of a non-rotatable core and a covering mounted to turn thereon, a pair of jaws in which the cores of some of said rolls are mounted, a shaft to which said jaws are secured, a fixed cutter, a movable cutter coöperating therewith carried by one of said jaws, a crank arm on said shaft, and a cam acting upon said crank arm for automatically rocking said shaft, moving said jaws, separating the rolls, and operating said cutters carried thereby from the remaining rolls.

46. In a cigar machine, a series of wrapper applying rolls designed to receive between them a cigar bunch, each of said rolls consisting of a non-rotatable core and a covering mounted to turn thereon, a fixed heading jaw, and a movable heading jaw in which the cores of said rolls are respectively mounted, a movable jaw coöperating with the movable heading jaw, a shaft connecting the same, means for intermittently rocking said shaft for separating the rolls carried by said movable jaws from the remaining rolls, and cutters carried respectively by said fixed and movable jaws, and coöperating with each other to cut the wrapper at the head end of the cigar when said movable jaws are moved outwardly.

47. In a cigar machine, the combination with a cluster of wrapper applying rolls having inwardly directed extremities and each provided with a pinion, one of the rolls being bent inwardly a greater extent at one extremity than the other rolls, of a rotary shaft located between said rolls and having a gear thereon meshing with the pinion of each roll, and a cutter carried by said shaft and located between the inwardly directed extremities of the rolls and coöperating directly with the roll having the greater inward extent than the remaining rolls to sever the projecting portion of the wrapper at the tuck end of the cigar.

48. In a cigar machine, the combination of a cluster of wrapper applying rolls having inwardly bent extremities and the extremity of one roll bent inwardly a greater distance than the extremities of the remaining rolls, means for rotating said rolls, and a cutter located between the rolls and carried by a portion of said means and directly contacting with the extremity of the roll having the greater inward bend to sever the projecting portion of the wrapper at the tuck end of the cigar.

49. The combination with wrapper applying rolls and a shaft from which motion is transmitted to said rolls, of a rocking disk mounted on said shaft and carrying a tucking needle, a needle rotator mounted on the shaft and having the needle continually projected through a portion thereof, an intermittently reciprocating bar carrying a rock shaft connected with the rocking disk, and an intermittently reciprocating slide carried by said bar and provided with an arm for moving said rock shaft.

50. The combination with wrapping mechanism, of a wrapper winding roller having means coöperating therewith for retaining a wrapper thereon and permitting delivery of the wrapper therefrom while rotating and traveling over said mechanism.

51. In a wrapping mechanism, a perforated wrapper carrying a wrapper winding roller for supporting and holding a wrapper thereon in a curved condition, a tubular supporting means for the roller, and air connections having communication with the interior of the supporting means and roller.

52. In a wrapping mechanism, a perforated wrapper carrying roller for supporting a wrapper thereon and having perforations spirally disposed around the axis thereof, and means for controlling air pressure within the roller to act through the perforations on the wrapper carried by the roller.

53. The combination with wrapping mechanism, of a perforated roller having suction effective through the interior thereof, a swinging arm carrying said roller, a tubular member in communication with the roller and carried by said arm, and means for rotating the roller.

54. The combination with a wrapping mechanism, of a perforated roller, a tubular member engaging said roller, connections whereby air may be exhausted from the roller, means for operating the perforated roller to bring it into delivery position with respect to the wrapping mechanism, and means for rotating the perforated roller to cause it to deliver the wrapper to the wrapping mechanism.

55. In a cigar machine, the combination with wrapping mechanism including a wrapper feeding means, of a rotary wrapper transferrer on which the wrapper is rolled and having a movement independent of the movement of the wrapper feeding means to deliver a wrapper to the latter.

56. The combination with a wrapping mechanism, of a wrapper support lying in a plane which does not intersect the wrapping mechanism, and including means for automatically and progressively projecting a portion of the wrapper in loose condition therefrom, means for effecting a relative movement between the wrapping mechanism and the support for causing the wrapper to be delivered to the article to be wrapped in the wrapping mechanism, and a transferring device operating to positively engage the loose extremity of the wrapper and transfer it to and hold it against said article to be wrapped at the beginning of the wrapping operation.

57. The combination with a wrapping mechanism, a rotatable wrapper conveyer, and means for moving the conveyer into delivery position, said conveyer having a rotation about its axis independent of its movement into delivery position to wind a wrapper upon and unwind a wrapper therefrom.

58. The combination with a wrapping mechanism, of a perforated wrapper conveyer, means for establishing suction in the conveyer, a holding device for the conveyer, means for moving the said holding device to bring the conveyer into delivery position, means for rotating the conveyer on the holding device independently of its movement into delivery position, to wind a wrapper upon and unwind a wrapper therefrom, and means for causing the conveyer to be gradually relieved of suction when delivering the wrapper.

59. The combination with a wrapping mechanism, of a swinging wrapper transferrer consisting of a rotary member operating to wind a wrapper thereon and unwind a wrapper therefrom.

60. The combination with a cigar wrapping mechanism and wrapper holding means, of a swinging wrapper conveying means involving a rotary member operating to pick up and wind a wrapper thereon from said holding means and unwind and deliver the wrapper to said wrapping mechanism.

61. In a cigar machine, the combination with wrapper applying mechanism, of a longitudinally movable frame, a wrapper feeder movable on said frame, and means for moving said frame and feeder relatively to the wrapper applying mechanism.

62. In a cigar machine, the combination with wrapper applying mechanism, of a frame, means for moving said frame longitudinally with respect to the wrapper applying mechanism, a wrapper feeder movable on the frame, and means for moving said frame and feeder relatively to the wrapper applying mechanism with varying speed.

63. The combination with a wrapping mechanism, of a perforated wrapper support, means for establishing suction in the support, a carrier in which said support is mounted to rotate, means for moving the carrier to bring the support into delivery position, means for rotating the support on the carrier for giving the support a traversing movement relatively to the wrapping mechanism, and means for relieving the support of suction when delivering the wrapper to the wrapping mechanism.

64. The combination with a wrapping mechanism, of a wrapper-presenting means upon which a wrapper is wound, a carrier therefor in which said means is mounted to rotate, means for moving the carrier to bring the wrapper-presenting means into delivery position, and means for rotating said presenting means on the carrier to deliver the wrapper.

65. The combination with a wrapping mechanism, of a perforated wrapper-supporting member upon which a wrapper is wound, means for establishing suction in the member, a carrier for the member, means for moving the carrier to bring the member into delivery position, and means for rotating the member to deliver the wrapper.

66. In a cigar machine, a wrapper-cutting die, a wrapper-feeder, a roller movable over said die and feeder, automatic means for transferring the wrapper from said die to said roller, and automatic means for transferring the wrapper from said roller to said feeder.

67. In a cigar-machine, a wrapper-cutting die, a wrapper-feeder, a traveling axially rotatable roller movable over said die and feeder, automatic means for transferring the wrapper from said die to said roller, and automatic means for transferring the wrapper from said roller to said feeder.

68. In a cigar-machine, a wrapper-cutting die, a wrapper-feeder, a traveling axially rotatable roller movable over said die and feeder, automatic means for transferring the wrapper from the die to said roller, and automatic means for transferring the wrapper from said roller to said feeder.

69. In a cigar machine, a hollow wrapper-cutting die, means for applying suction to said die for retaining the wrapper in place thereon, a perforated wrapper-feeding device, means for applying suction thereto, a hollow perforated roller, movable over said die and feeding device, means for applying suction to the interior of said roller, and means for automatically increasing the suction in said roller as it passes over said die and decreasing the same as it passes over said feeding-device.

70. In a cigar machine, a hollow wrapper-cutting die, means for applying suction thereto for retaining the wrapper in place thereon, means for varying the suction to said die, a perforated wrapper-feeding device, means for applying suction thereto, a hollow perforated roller movable over said die and feeding device, means for applying suction to said roller, and means for automatically increasing the suction in said roller as the same passes over said die, and decreasing the same as it passes over said feeding device.

71. In a cigar machine, wrapper-applying mechanism, a wrapper-cutting die, a wrapper-feeder, a roller, means for causing said roller to travel from said die to said wrapper feeder in contact with the upper surfaces thereof, means for rotating said roller on its axis as it passes over said die and over said feeder, means for arresting the axial movement of said roller as it passes from one of said parts to the other, and means for transferring the wrapper from said die to said roller, and from said roller to said feeder and wrapper applying mechanism.

72. In a cigar machine, a wrapper-cutting die, a wrapper-feeding device, a roller, a supporting means or carrier for said roller in which the same is mounted for axial rotation, means for revolving said supporting means to move said roller from said die to said feeding device in contact with the upper surfaces thereof, a fixed mutilated gear, a pinion connected with said roller and meshing with said gear, the teeth of said gear being adapted to be engaged by said pinion for rotating said roller on its axis as it passes over said die and over said feeding device, a flattened portion on the axis of said roller, and a spring-actuated presser-block adapted to engage said flattened portion to arrest the axial turning movement of said roller as it passes between said die and said feeding device.

73. In a cigar machine, a rotary hollow shaft, a suction-pipe communicating with the interior thereof, a hollow roller revolved by said shaft and having a hollow stem communicating with the interior of said shaft, a valve for controlling the passage from said shaft to said stem, and means automatically thrown into operation by the rotation of said shaft for increasing and decreasing the size of said passage, and thereby increasing and decreasing the suction within said roller.

74. In a cigar machine, a rotary hollow shaft, a suction-pipe communicating with the interior thereof, a hollow roller revolved by said shaft and having a hollow stem communicating with the interior of said shaft, a valve for controlling the passage from said shaft to said stem, a fixed cam, and a lever held in contact with said cam and connected with said valve for actuating the latter and moving it toward and away from said stem and thereby varying the suction within said roller.

75. In a cigar machine, a rotary hollow shaft, a suction-pipe communicating with the interior thereof, a hollow roller revolved by said shaft and having a hollow stem communicating with the interior of said shaft, a valve for controlling the passage from said shaft to said stem, a fixed cam, a lever pivotally connected with said shaft, and bearing at its free end against said cam, a spring for holding said lever in contact with said cam, and connections between said lever and said valve for moving the same toward and away from the end of said stem to vary the suction in said roller.

76. In a cigar machine, a hollow rotary shaft, a suction-pipe communicating with the interior thereof, a bracket arm secured to said shaft, a fixed gear surrounding said hollow shaft, a hollow roller, a hollow stem therefor having perforations therein communicating with the interior of said roller, the said stem being mounted for axial movement in said bracket arm and in said hollow shaft, a fixed tubular extension at the inner end of said stem extending into said hollow shaft, a pinion on said stem meshing with said fixed gear, a valve fulcrumed within said hollow shaft and movable toward and away from said tubular extension for varying the suction within said hollow roller, a cam on said fixed gear, a lever pivotally connected with said shaft, a spring for retaining said lever in contact with said cam, and connections between said lever and said valve for operating it.

77. In a cigar machine, a hollow wrapper-cutting die, a valve-casing communicating with the inside thereof, a valve in said casing, a perforated wrapper feeding device coöperating with a suction-box, a hollow rotary shaft having two sets of openings in the walls thereof, a fixed sleeve in which said shaft is mounted to turn, a main suction-pipe, connections between said suction-pipe and said suction-box, connections between said suction-pipe and said hollow sleeve opposite one set of openings in said hollow shaft, connections between said sleeve at a point opposite the other set of openings in said hollow shaft, and said valve-casing, a perforated roller movable from said die to said wrapper feeding device over the upper surface thereof, a hollow stem for said roller mounted in a bracket secured to said hollow shaft and communicating with the interior of said hollow shaft, and a valve controlling the passage between said hollow shaft and said stem automatically thrown into operation by the rotation of said shaft for varying the suction on the inside of said roller.

78. The combination with a cutting bed, of means for holding a sheet of material thereon, a coöperating cutting member, means for producing a relative cutting movement between said members, and means for transferring the cut portion of the sheet from the bed to the coöperating cutting member.

79. The combination with a cutting-bed, of means for holding a sheet of material thereon, a coöperating perforated member, means for establishing suction in the member whereby the cut portion of the sheet is transferred from the bed to the member, and means for producing a relative cutting movement between the bed and member.

80. The combination with a wrapping mechanism, of a cutting bed having means for holding an uncut wrapper thereon, a transferring wrapper support for conveying the cut portion of the wrapper from the bed to the wrapping mechanism, and mechanism for producing a relative cutting movement between the bed and support and a relative delivering movement between the support and the wrapping mechanism.

81. The combination with a cutting-die, of means for holding material thereon, a perforated coöperating roller, means for creating suction therein, means for producing a relative cutting movement between the bed and the roller, whereby a portion of the sheet is cut out and transferred to the roller, and means for positively driving said roller during the cutting movement.

82. The combination with a cutting-die, of means for holding a sheet of material thereon, a coöperating perforated roller, means for establishing suction in the roller whereby the cut portion of the sheet is transferred from the bed to the roller, and means for producing a relative cutting movement between the bed and the roller, substantially as described.

83. The combination with a cutting-bed, of means for holding a sheet of material thereon, a coöperating perforated roller, means for establishing suction in the roller whereby the cut portion of the sheet is transferred from the bed to the roller, and means for moving the roller over the bed, substantially as described.

84. The combination with a cutting-bed, of means for holding material thereon, a perforated coöperating roller, means for creating suction therein, means for producing a relative cutting movement between the bed and the roller whereby a portion of the sheet is cut out and transferred to the roller, and means for positively driving the roller during the cutting movement, substantially as described.

85. The combination with a cutting bed, of means for holding a sheet of material thereon, a coöperating perforated roller, means for creating suction therein, means for moving the roller over the bed to cut and take up a portion of the material therefrom, and means for positively driving the roller as it moves across the bed, substantially as described.

86. In a cigar machine, the combination with a wrapper holding means from which a wrapper is adapted to be taken and delivered to another point, of a roller having a swinging movement over the said wrapper holding means to pick up and wind a wrapper thereon and carry the wrapper under tension away from said holding means to a point of delivery.

87. The combination with a wrapper cutting die, of a suction controlled roller movable over the said die and operating to simultaneously cut a wrapper and pick up the said wrapper as cut from the die.

88. The combination with a wrapper holding means, of a roller movable over the holding means to pick up and wind thereon and carry the wrapper away from the holding means, the wrapper being held under tension or in stretched condition.

89. The combination with a wrapper holding means and means for supporting a cigar bunch, of a roller having a swinging movement over the holding means and adapted to pick up and carry a wrapper therefrom to the cigar bunch supporting means, the wrapper when on the roller being in stretched condition throughout its entire area to facilitate accurate application of the wrapper to a cigar bunch.

90. The combination with a wrapper holding means and wrapping mechanism, of a wrapper transferrer consisting of a rotatable member operating to wind and unwind a wrapper and deliver the latter to said mechanism.

91. The combination with a wrapper holding means and wrapping mechanism, of a wrapper transferrer consisting of a perforate rotatable member operating to wind and unwind a wrapper and deliver said wrapper to the wrapping mechanism.

92. In a cigar machine, the combination of a wrapper cutting bed, a roller having suction means and having a horizontal swinging movement with respect to said bed to cut a wrapper and remove it from the latter, and a support to which the wrapper is delivered from the roller.

93. In a cigar machine, the combination with cigar wrapping mechanism, of a swinging wrapper winding roller for delivering a wrapper to said mechanism during rolling movement of said roller.

94. In a cigar machine, the combination with a wrapping mechanism and a cutting bed, of a wrapper winding roller for removing the wrapper from the bed and maintaining said wrapper in stretched condition while conveying the wrapper to the wrapping mechanism.

95. In a cigar machine, the combination with a cutting bed, of a wrapper winding roller for removing a wrapper under tension from said bed and transferring it to a predetermined point.

In testimony whereof I have hereunto set my hand in presence of two subscribing witnesses.

JOSEPH D. LACROIX.

Witnesses:
  Wm. M. Stockbridge,
  Geo. W. Rea.